United States Patent [19]

Yamada et al.

[11] Patent Number: 4,656,079

[45] Date of Patent: Apr. 7, 1987

[54] REVERSIBLE OPTICAL INFORMATION RECORDING MEDIUM

[75] Inventors: Noboru Yamada, Hirakata; Eiji Ohno, Neyagawa; Kunio Kimura, Hirakata, all of Japan

[73] Assignee: Matsushita Electric Industrial Co., Ltd., Osaka, Japan

[21] Appl. No.: 743,801

[22] Filed: Jun. 12, 1985

[30] Foreign Application Priority Data

| Jun. 15, 1984 | [JP] | Japan | 59-123001 |
| Jun. 15, 1984 | [JP] | Japan | 59-123002 |
| Jun. 15, 1984 | [JP] | Japan | 59-123003 |
| Jun. 15, 1984 | [JP] | Japan | 59-123004 |
| Jun. 21, 1984 | [JP] | Japan | 59-127970 |

[51] Int. Cl.⁴ .................... B32B 15/04; G01D 15/14; G01D 15/34
[52] U.S. Cl. .................... 428/209; 346/76 L; 346/135.1; 346/137; 428/412; 428/432; 428/461; 428/463; 428/913; 430/945
[58] Field of Search ............... 428/209, 432, 913, 412, 428/461, 463; 430/21, 495, 346; 346/135.1, 76 L, 137

[56] References Cited

U.S. PATENT DOCUMENTS

| 3,530,441 | 9/1970 | Ovshinsky | 430/21 X |
| 3,971,874 | 7/1976 | Ohta et al. | 428/432 |
| 4,278,734 | 7/1981 | Ohta et al. | 428/432 |
| 4,278,758 | 7/1981 | Drexler et al. | 430/495 X |
| 4,461,807 | 7/1984 | Mori et al. | 428/209 X |
| 4,587,209 | 5/1986 | Ohno et al. | 430/346 X |

Primary Examiner—Thomas J. Herbert
Attorney, Agent, or Firm—Stevens, Davis, Miller & Mosher

[57] ABSTRACT

A reversible optical information recording medium which permits recording, reproducing, erasing and re-writing at high speeds by means of laser beams. The reversible optical information recording medium has a recording thin film which is essentially constituted by Te-Au-O, and Ge or Se. In the system which employs Ge, the recording thin film is formed by addition of at least one selected from a group consisting of Sn, In, Bi and Sb, such as to reduce the Au content in the film composition. On the other hand, in the system which employs Se, a further improvement in the stability of the recorded signal is achievable by the addition of Ge, and an improvement in the recording/erasing sensitivities, particularly erasing sensitivity, can be enhanced by addition of at least one element selected from a group consisting of Sn, In, Bi and Sb. The recording/erasing mechanism in the reversible optical information recording medium of the invention mainly relies upon a change in the optical characteristic which in turn is caused mainly by a reversible phase change of Te. The phase change in the recording medium of the invention can be effected by a laser beam of an extremely low light power density and short irradiation time as compared with that required by the conventional optical information recording medium. This in turn permits much higher speed of recording and erasing of information over the conventional optical information recording medium.

14 Claims, 47 Drawing Figures

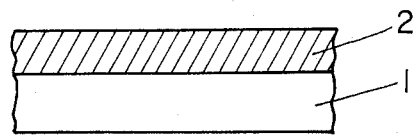
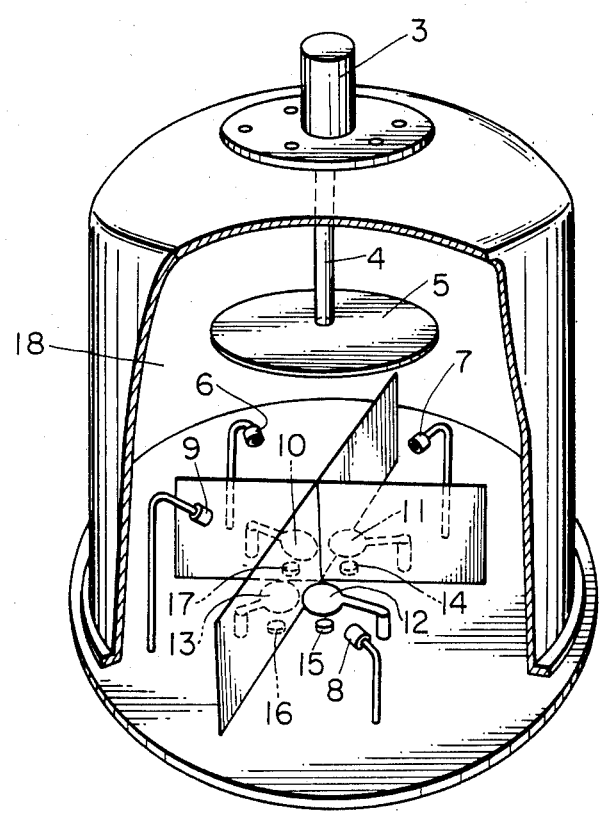

REVERSIBLE OPTICAL INFORMATION RECORDING MEDIUM

BACKGROUND OF THE INVENTION

1. Field of the Invention

The present invention relates to a reversible optical information recording medium such as an optical disk which is designed for a high signal density and quick recording, reproducing, erasing and rewriting of optical information by means of a laser beam.

2. Description of the Prior Art

Technics have been known for high-density recording and reproducing of information by means of a laser beam, and are being vigorously applied to various systems such as document filing systems, still picture filing systems and so forth. At the same time, reports are being made concerning the studies and developments of rewritable recording systems.

On the other hand, recording mediums have been proposed in which repetitional recording and erasing of information are effected through changing optical charactersitics such as the refractive index, extinction coefficient and so forth by causing a reversible structural change in the material of a recording thin film as the recording medium by means of high-density energy of a laser beam. One of these recording mediums makes use of a reversible phase change of Te.

For instance, the specification of U.S. Pat. No. 3,530,441 discloses a Te-based amorphous thin film containing no oxygen, e.g., $Te_{81}Ge_{15}Sb_2S_2$. In this recording medium, the phase change between the amorphous phase and the crystalline phase of Te is facilitated by the addition of additional elements such as Ge, Sb and S. This recording medium, however, has not been put into practical use satisfactorily because of insufficient recording sensitivity and small resistance to oxidation by moisture.

Attempts for improving the moisture-proof property has been made by using a thin film made of an alloy of Te-O system.

In this Te-O system alloy, fine grains of Te of less than 20A in size are dispersed in the $TeO_2$ matrix or, alternatively, Te and $TeO_2$ are mixed with each other in an almost amorphous state such that no peak can be found through an X-ray diffraction. It has been reported that a reversible recording and erasing is possible with a medium made of an alloy system formed by adding S and Se to the Te-O system alloy as shown in U.S. Pat. No. 4,278,734 or with a medium of an alloy system formed by adding Sn, Ge, In, Sb and/or Bi to the Te-O system alloy as shown in Japanese Patent Laid-Open No. 185048/1984.

When these systems are irradiated for a short period of time by a laser beam of a high energy density, the temperature of the area irradiated with the laser beam is raised abruptly to a level above the melting point so that the Te atoms are made random. After the irradiation, this area is cooled quickly and is frozen while remaining the Te atoms random, thus recording an information in amorphous state. When this area is irradiated with a laser beam of a comparactively low energy density for a comparatively long period of time, the irradiated area is heated and maintained over the crystallization temperature for a while, so that Te atoms resumes the initial ordering such as to be crystallized thus erasing the recorded information. The additional elements mentioned before serve to stabilize the amorphous state of Te and to control the crystallization speed, upon bonding to Te. Among these elements, S and Se contribute mainly to the stabilization of the amorphous state of Te and does not produce any other effect. Thus, the alloy system containing S or Se requires a long time for crystallization, i.e., for erasing.

As to other elements such as Sn, Ge, In, Bi and Sb, minute stuides have been made and the following reports have been made.

Regarding Ge, it has been confirmed that Ge forms a strong amorphous network structure with Te such as to increase the crystallization temperature, thus controlling the thermalstability of the recording signal bit even when its amount is trace, as reported in page 87, brochure of 30th symposium of applied physics, 1983. Sn, In and Bi have such semimetallic natures as to easily form amorphous state as compared with transition metal elements such as Fe and Ni. Thus, these elements provide adantageous effects in that, during the recording by forming the amorphous state, they suppresses the growth of crystal by bonding with Te when cooled from the molten state and also in that the bondage is easily broken so that they serve as nuclides for the recovery of the crystanity during the erasing by crystallization. Thus, recording sensitivity and erasing sensitivity can be improved by suitably selecting the contents of these elements.

With these knowledges, a test optical disk was formed by using thin recording film which contains both Ge and Sn, as reported in the brochure of JAPAN DISPLAY, 1983 p. 46.

This optical disk permits an erasing of old information and recording of new information in real time and exhibits a high thermal stability of recorded signal bits, but is still unsatisfactory in that it shows only low sensitivity particularly in erasing. Therefore, when this optical disk is used in combination with a laser diode now available, it is necessary to operate the laser diode almost with its full power. In consequence, a further improvement in the sensitivity is necessary.

An approach has been made to improvement in the crystallization speed from another point of view. For instance, Japanese Patent Application No. 61463/1984 proposes that the crystallization speed of Te-O system alloy can be increased by addition of Au. In this material, however, the change of the state is possible only once irreversibly from amorphous state to crystalline state and, therefore, cannot be used for repetitional recording and erasing.

SUMMARY OF THE INVENTION

Accordingly, an object of the invention is to provide a reversible optical information recording medium which exhibits a high thermal stability in the recording amorphous state and which permits a repetitional high-speed recording and erasing with a low power of laser beam as compared with conventional medium, thereby improving the properties of the conventional recording medium of Te-O based alloy.

Another object of the invention is to provide a reversible optical information recording medium having a high stability even under a condition of high humidity.

To these ends, according to the invention, the reversible optical information recording medium is made from a Te-O system alloy having a comparatively large Te content, with addition of a suitable amount of Au as an essential element for increasing the crystallization speed, i.e., erasing speed and a suitable amount of Ge or Se as an element essential for promoting the amorphosization of Te, is a suitably selected composition ratio of the former and the latter.

When Ge is added, a recording layer is formed by further adding at least one element selected from a group consisting of Sn, In, Bi and Sb, such as to reduce the content of Au in the film composition. When Se is added, it is possible to add also Ge such as to increase the crystallization temperature thereby further improving the stability of the amorphous recording state.

Furthermore at least one element selected from a group consisting of Sn, In, Bi and Sb can be substituted for a part of Au and Se or alternatively such as to reduce the content of Au in the film composition particularly. And the sensitivities in recording and erasing can be enhanced by adding at least one of such elements somewhat in excess of the amount possible for forming a chain or network with Te.

BRIEF DESCRIPTION OF THE DRAWINGS

FIG. 1 is a sectional view of an embodiment of an optical information recording medium in accordance with the invention;

FIG. 2 is a fragmentary perspective view of an example of an evaporation apparatus for use in the production of the optical information recording medium in accordance with the invention;

DESCRIPTION OF THE PREFERRED EMBODIMENTS

Figure 3:
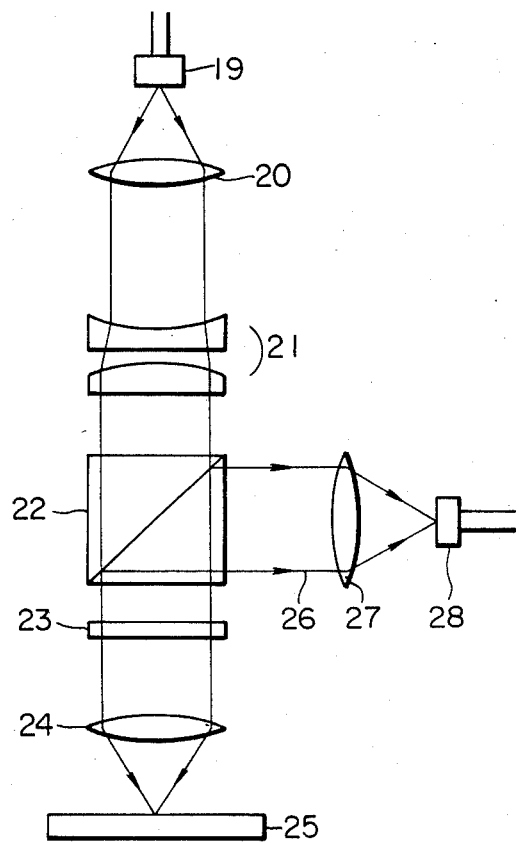
FIG. 3 is a sectional view of an optical system for measuring the recording and erasing characteristics of an optical information recording system in accordance with the invention.

As explained in the "description of the prior art", the recording film made of a quadruple alloy of Te-O-Sn-Ge system could not exhibit sufficiently high sensitivity, although they permits a simultaneous erasing and recording in real time. The limit in the sensitivity in this quadruple alloy of Te-O-Sn-Ge system is attributable to the fact that, as explained before, Sn is used for two different purposes. Namely, when the Sn content is increased, one of the two functions, i.e., the function of serving as nuclides for the recovery of the crystanity is enhanced but the melting point of the system is raised to suppress the melting, i.e., recording of information. To the contrary, when the Sn content is decreased, the nuclides for the crystallization is decreased to make the erasing difficult, although the melting point is lowered to facilitate the melting. Needless to say, an excessive reduction in the Sn content makes Te difficult to be amorphous state, thus imparing the reversibility. Thus, both the recording sensitivity and erasing sensitivity depends on the Sn content. Therefore, in the preparation of the material, the Sn content has to be selected to satisfy both the demand for recording sensitivity and the demand for erasing sensitivity, so that both sensitivities are limited inevitably.

Under this circumstance, the present invention proposes to use different materials for satisfying two independent roles of Sn: namely, the suppression of growth of Te crystal grains during the recording (formation of amorphous phase) is effected mainly by Ge or Se, while the formation of nuclides during the erasing (crystallization) is effected mainly by Au, so that the degree of freedom in the material design is increased to attain a higher sensitivities.

A description will be made as to the functions of Ge and Se. Ge forms amorphous network in combination with Te such as to enhance the thermalstability of recording signal bit in amorphous phase. A too large Ge content, however, raises the melting point of whole system excessively and unnecessarily raises the stability of amorphous phase such as to raise the crystallizing temperature, so that the reversibility is impaired undesirably. In order to compensate for this reduction, it is necessary to add a large amount of Au. As will be explained later, it is possible to limit the Ge content and, at the same time, to reduce the Au content by using Sn, In or the like as an additive.

On the other hand, Se largely contributes to the formation of amorphous phase of Te as it can substitute for Te in the chain structure of Te. In addition, since Se and Te can form a solid solution perfectly at any ratio, the melting point of the system is not changed substantially by the addition of Se, so that the recording sensitivity, i.e., the amorphousforming sensitivity, of the system can be maintained at a high level regardless of the addition of Se. Nevertheless, the crystallization temperature is not raised substantially by the addition of Se, so that a further addition of small amount of Ge is allowed for attaining a higher thermalstability of the system. As in the case of using Ge, a part of Se and Au can be substituted by Sn, In, Bi, Sb or the like element for the purpose of limiting the Au content, particuraly.

In the amorphous Te chain structure, Au substitutes for a part of Te such as to interrupt the Te chain. In this state, Au can be mixed with Te over a wide mixing ratio. Au-Te has a comparatively large tendency of crystallization and, hence, can easily form crystalline nuclids when irradiated with a laser beam, thereby to increase the speed of phase change from the amorphous phase to crystalline phase during the erasing. In addition, when Au content is rather high, the Au-Te exhibits a melting point substantially equal to that obtained in the eutectic state. Since the melting point is not raised so largely, it is possible to obtain both the increased erasing speed and a high recording sensitivity. In addition, since Au generally exhibits a high resistance to oxidation, a large effect is produced even by a small amount of addition of Au to the Te-O system.

Using a Te-O system alloy as a base, alloys of various composition ratios were prepared by adding Se or Ge for the purpose of promotion of amorphous formation, Au for erasing speed and an additive selected from a group consisting of Sn, In, Bi and Sb. An experiment was conducted by varying the contents of these elements, in order to seek for the optimum composition design.

FIG. 1 shows in section an optical information recording medium of the invention. The recording medium has a substrate 1 on which is formed a recording thin film 2 by vacuum evaporation or spattering. The substrate may be such one as those used conventionally for optical disks. Namely, transparent resins such as PMMA, vinylchloride, polycarbonate and so forth, as well as glass sheet, can be used as the material of the substrate 1.

FIG. 2 shows the internal structure of a belljar of quadruple alloy evaporating system used in the production of the recording medium in accordance with the invention. In this Figure, numerals 14 to 17 denote, respectively, sources corresponding to, for example, Te, TeO$_2$, Ge or Se and Au, 10 to 13 denote shutters and 6 to 9 denote heads of film thickness monitors. After an evacuation of a vacuum system 18 to a level of $10^{-5}$ Torr, four electron beam guns (not shown) disposed in the vacuum system were driven to heat four sources by independent electron beams. While the evaporation rates are monitored and fed back to the electric power supply, a quadruple alloy thin film of, for example, Te-O-Ge-Au system was formed on a rotary plate 5 which is carried by a shaft 4 connected to an external motor 3.

When the addition of Sn, In or the like is necessary, a sintered pellet shown in, for example, Japanese Patent Application No. 116317/1983 is usable as the Te-O source. With such a method, it is possible to accurately control five kinds of element by means of four sources. The film composition can be determined by known methods such as AES, XPS, XMA, SIMS and IPC.

Needless to say, the evaporation may be conducted by using five sources, or the number of the sources may be decreased by using the mixture pellets as shown in Japanese Patent Application No. 233009/1983. It is also possible to form the thin film by spattering.

The recording films thus formed were subjected to an evaluation test which was conducted in accordance with the following method.

Considering that the recording medium of the invention are to make use of the repetitional reversible change of the phase, the evaluation has to be made in two aspects: namely, the property of change for greater optical constant, i.e., for erasing property (this property will be referred to as "darkening property" because the optical density is increased by the erasing) and the property of change for smaller optical constant, i.e., recording property (this property will be referred to as "whitening property" because the optical density is reduced as a result of recording).

FIG. 3 schematically shows an optical system used in the evaluation.

A laser beam emitted from a laser diode 19 is changed into a parallel beam by a first lens 20 and is shaped into a beam having a circular cross-section by a second lens system 21. Then, through a beam splitter 22, a quarter wavelength plate 23 and a third lens system 24, the beam is focussed into a spot of a substantially diffraction limit, i.e., a spot of about 0.9 $\mu m\phi$ in diameter, and is applied to the recording medium 25 thus effecting a recording. In order to confirm the state of recording, the laser beam is applied at such as low light power density as not to cause a recording of any signal. The light 26 reflected by the recording medium is introduced to the beam splitter 22 taking the path reverse to that for the incident light, and is deflected by the beam splitter 22 such as to be introduced through a fourth lens system 27 to a photodetector 28 adapted to detect the change in the reflectivity of the recording medium. The power of the laser diode was modulated to vary the laser light power density and the pulse width of the beam pulse applied to the recording medium. The darkening property (erasing property) and the whitening property (recording property) were evaluated by analyzing the response characteristics.

Figure 4:
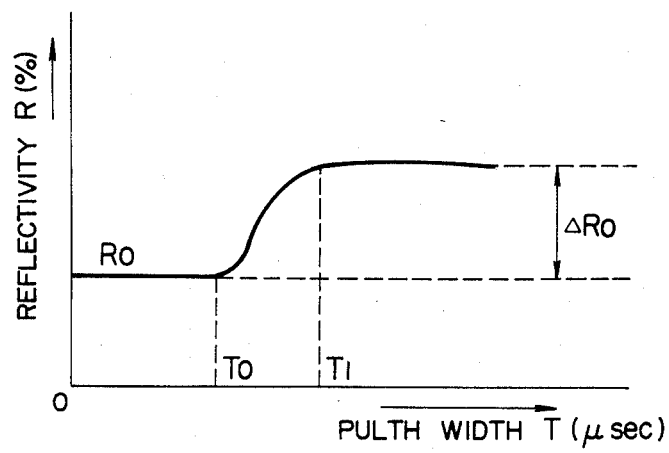
FIG. 4 is a graph explanatory of a method of evaluation of darkening property (crystallization or erasing speed) of an embodiment of the optical information recording medium in accordance with the invention.

In the evaluation of the darkening property, the recording medium was irradiated with the laser beam with the light power density fixed at a comparatively low level of, for example, 1 mW/$\mu m^2$ on the medium surface, while varying the irradiation time, and the time length until the darkening is started was measured. The reflectivity was changed in a manner shown in FIG. 4. It will be seen that the darkening is commenced and the reflectivity is increased when the pulse width of the laser beam pulse has exceeded T$_0$. The reflectivity is saturated when the pulse width has exceeded T$_1$, thus indicating the completion of darkening. It will be seen that the pulse width T$_1$ shows the time required for the darkening, while Δ Ro repesents the degree of darkening. The evaluation of the darkening property may be conducted by varying the light power density of the beam while fixing the irradiation time at, for example, 1 μsec. In such a case, the light power density at which the darkening is started is measured. With this method, it is possible to know the darkening sensitivity of the medium.

Figure 5:
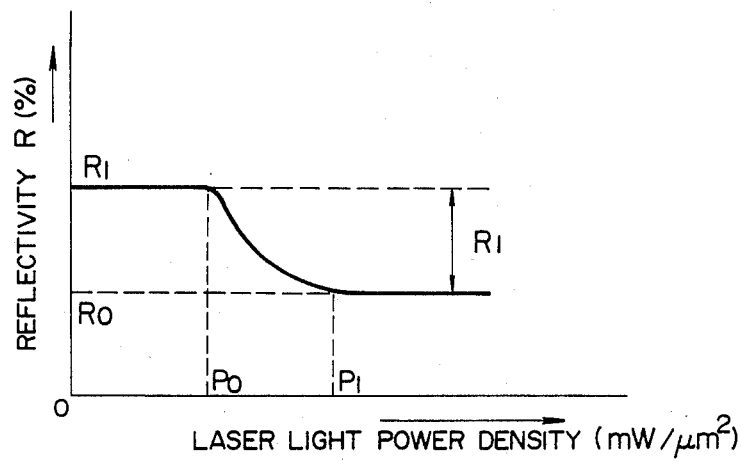
FIG. 5 is a graph explanatory of a method for evaluating the whitening property (amorphousizing (amorphous forming) sensitivity)

The evaluation of the whitening property was conducted as follows. For this purpose, the recording medium was irradiated with a laser beam which has a comparatively small light power density and a large pulse width such as to completely darken the irradiated area on the medium. Then, the darkened area was irradiated with a laser beam of a light power density fixed at a comparatively high level of 7 mW/μm$^2$ and the minimum time length till the start of the whitening was measured. According to another evaluation method, the laser beam power density was varied while the irradiation time was fixed at a short length of, for example, 50 nsec, and the laser beam power density at which the whitening was commenced was measured. The reflectivity is changed in a manner shown in FIG. 5. Namely, the whitening of the irradiated area is commenced such a to reduce the reflectivity R when the laser beam power has exceeded Po. The reducing tendency of the reflectivity R is ceased when the power has exceeded P$_1$. In this state, in the sample which has a large likelihood of whitening, the reflectivity approaches the value Ro in the initial as deposited state and the darkened area is whitened almost perfectly. Thus, P$_1$ represents the laser light power required for the whitening, while ΔR$_1$ represents the degree of whitening.

An explanation will be made hereinunder as to the result of the evaluation test which was conducted in accordance with the above-explained methods on the recording mediums of various compositions formed by the methods explained before.

The explanation will be commenced first with the recording medium made of a quadruple alloy of Te-O-Au-Ge system.

EMBODIMENT 1

Figure 6A:
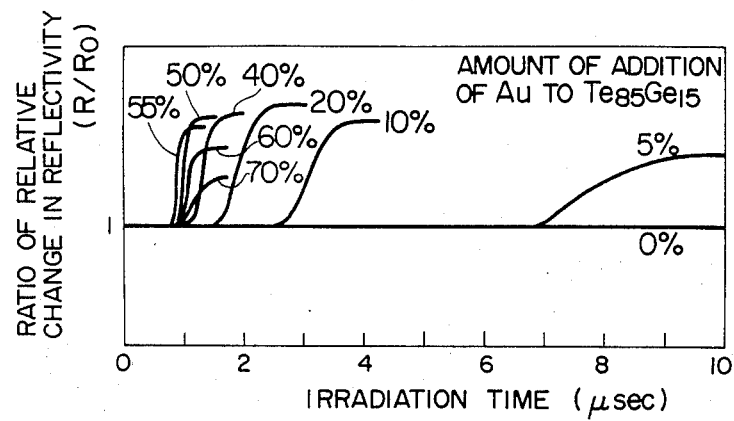
FIGS. 6a, 6b and 7 are graphs showing change in the recording/erasing properties (darkening/whitening properties) caused by a change in the Au content in an optical information recording medium of the invention made of a Te-O-Au-Ge system alloy.

Effect of addition of Au was examined by fixing the composition ratio between Te and Ge. Fixing the ratio or content of oxygen to the whole at a level of 20 at% and controlling the composition such that the atomic ratio between Te and Ge is 85:15, various compositions were formed by varying the Au composition ratio in the ternary alloy of Te-Ge-Au system, and recording medium samples were prepared from these compositions. FIG. 6a shows how the irradiation time required until the darkening is started is varied in relation to the Au content, when the laser beam power was applied at a power density of 1 mW/μm$^2$. From this Figure, it will be understood that the irradiation time till the starting of the darkening is largely shortened by the addition of Au, i.e., that the crystallization speed is increased by the addition of Au, and also that the reflectivity changing ratio R/Ro is increased by the addition of Au. When the Au was not added, i.e., with the composition expressed by $(Te_{0.85}Ge_{0.15})_{80}O_{20}=(Te_{68}Ge_{12}O_{20})$, no darkening took place at all by irradiation for 10 μsec with the light power density of 1 mW/μm$^2$. However, the effect becomes appreciable when the Au content is increased to 10 at %.

It will be seen also that, when the Au content in thernary alloy of Te-Ge-Au system is increased beyond 60 at %, the reflectivity changing ratio is drastically decreased. This is attributable to a shortage in the amount of Te which is the major element contributing to the change in the optical characteristics. A sufficiently large reflectivity changing ratio is obtainable when the Te content is not smaller than 35 at %.

Figure 6B:
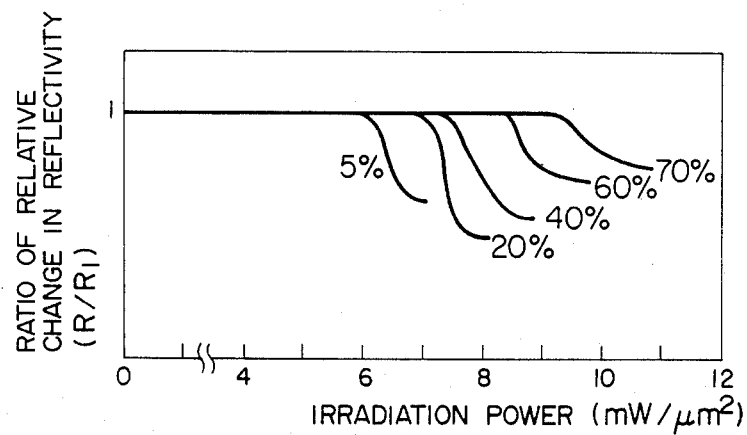

The recording medium samples were sufficiently darkened by irradiation with a laser beam of a light power density of 1 mW/μm for 15 μseconds, and the darkened samples were then irradiated with a laser beam of various levels of power density for a constant period of 50 nsec. FIG. 6b shows how the level of the light power density at which the whitening is commenced is varied by a change in the Au content. From this Figure, it will be seen that, although the light power density of the laser beam required for the start of the whitening is slightly increased by addition of Au, the recording medium made of the ternary alloy of Te-Ge-Au system is practically usable provided that the composition ratio of Au in the Te-Ge-Au system is below 60 at %.

These two Figure show that, in a system in which the composition ratio of 0 to the whole system is fixed at 20% while the ratio between Te and Ge is fixed at 85:15, it is possible to remarkably improve the erasing speed without impairing the recording property, provided that the Au composition ratio in the ternary system of Te-Ge-Au is selected to range between 10 and 60 at %.

Similar experiments were conducted while increasing the ratio of Ge to Te.

EMBODIMENT 2

Figure 7:
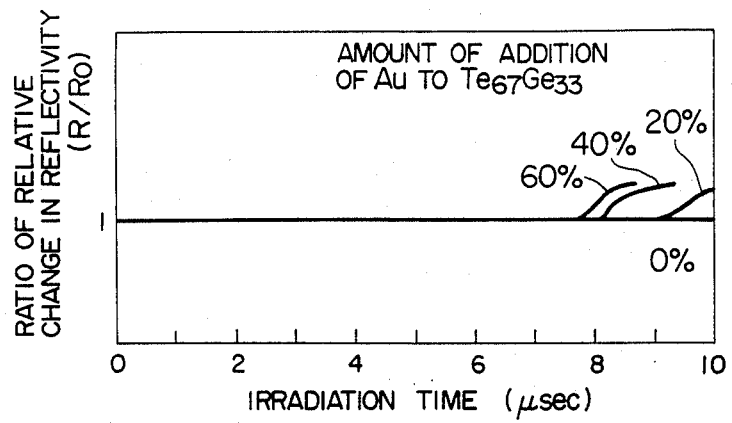

Fixing the ratio or content of oxygen to the whole at a level of 20 at % and controlling the composition such that the atomic ratio between Te and Ge is 67:33, various compositions were formed by varying the Au composition ratio in the ternary alloy of Te-Ge-Au system, and recording medium samples were prepared from these compositions. FIG. 7 shows the result of evaluation conducted in the same way as the Embodiment 1. From this Figure, it will be seen that the irradiation time necessary for the start of darkening is shortened by the addition of Au by an amount ranging between 10 and 60 at %, as in the case of Embodiment 1, although the effect of addition is not so remarkable as that observed in Embodiment 1. This is attributed to the fact that, in the region in which the atomic ratio between Te and Ge is around 2:1, Te and Ge form quite a stable amorphous phase so that the addition of Au does not produce sufficiently large effect. Namely, it was found that, in the recording film made of the quadruple alloy of Te-O-Ge-Au system, the performance is largely affected by the composition ratio between Te and Ge, and the result of addition of Au is impaired as the ratio of Ge to Te approaches near ½. An explanation will be made hereinunder as to an experiment which was conducted to investigate the effect of addition of Ge as observed when the ratio between Te and Au is fixed.

EMBODIMENT 3

Fixing the ratio or content of oxygen to the whole at a level of 20 at % and controlling the composition such that the atomic ratio between Te and Au is 75:15, various compositions were formed by varying the Ge composition ratio in the ternary alloy of Te-Au-Ge system, and recording medium samples were prepared from these compositions. Evaluation was conducted on these recording medium samples.

Figure 8A:
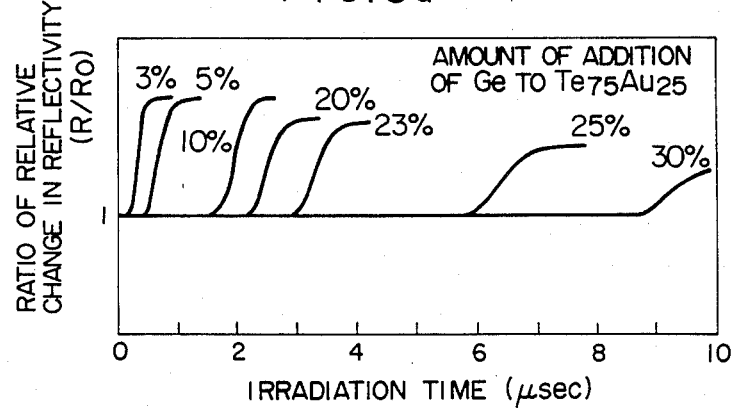
FIGS. 8a, 8b, 9a and 9b are graphs showing change in the recording/erasing property (darkening/whitening property) caused by a change in Ge concentration in an optical information recording medium of the invention made of a Te-O-Au-Ge system alloy.

FIG. 8a shows how the time length till the start of darkening is changed when the composition ratio of Ge is changed, as observed when a laser beam of a power density of 1 mW/$\mu$m$^2$ was used.

From this Figure, it will be seen that the time length till the start of darkening is progressively increased as the composition ratio of Ge is increased, and is drastically prolonged when the composition ratio of Ge has exceeded 23 at %. Namely, when the Ge composition is increased beyond 23 at %, the darkening speed is reduced to make the composition practically unusable.

Figure 8B:
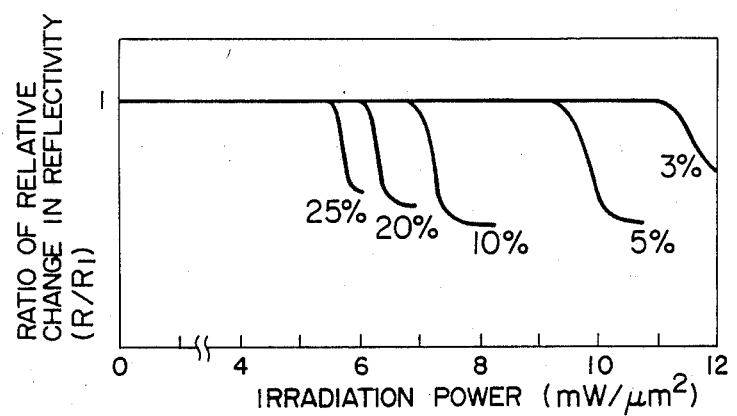

FIG. 8b shows the change in the light power density of the laser beam required for the start of the whitening, as observed with various composition ratio of Ge. The previous darkening was conducted by application of a laser beam of 1 mW/$\mu$m$^2$ for 15 $\mu$sec. The power of a laser density of laser beam used in the whitening was varied between 0 and 12 mW/$\mu$m$^2$, while the irradiation time was fixed at 50 nsec.

These two Figures show the following fact. Namely, the light power density of the laser beam required for the start of whitening is decreased, i.e., the recording sensitivity is improved, as the composition ratio of Ge is increased. A practically acceptable sensitivity is obtained even with a small Ge composition ratio of 5%. This tendency is maintained when the Ge composition ratio ranges between 0 and 25 at %. However, if the Ge composition ratio is increased excessively, the melting point of the system is increased so that the sensitivity is lowered.

From these two kinds of expriments, it was confirmed that, in the ternary alloy of Te-Ge-Au system in which the O composition ratio to the whole system is fixed at 20 at % and the ratio between Te and Au is selected to be 75:25, it is possible to obtain a high recording sensitivity and a high erasing speed, provided that the Ge composition ratio in the ternary alloy of Te-Ge-Au system is selected to range between 5 and 23%.

An explanation will be made hereinunder as to the result of a similar experiment conducted with samples an increased composition ratio of Au to Te.

EMBODIMENT 4

Fixing the ratio or content of oxygen to the whole at a level of 20 at % and controlling the composition such that the atomic ratio between Te and Au is 50:50, various compositions were formed by varying the Ge composition ratio in the ternary alloy of Te-Au-Ge system, and recording medium samples were prepared from these compositions. Evaluation was conducted on these recording medium samples in the same way as Embodiment 3.

Figure 9A:
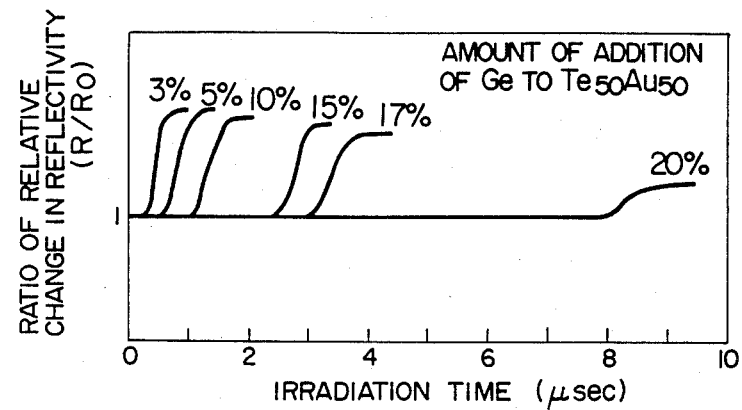
Figure 9B:
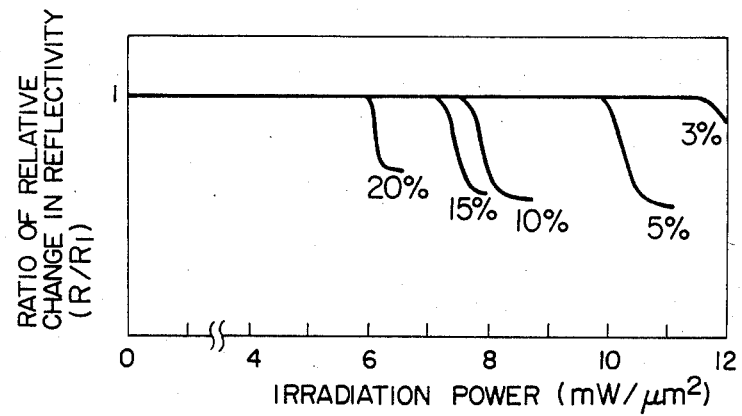

FIG. 9a shows how the time length till the start of darkening is changed when the composition ratio of Ge is changed, while FIG. 9b shows the result of measurement of the light power density required for the start of the whitening.

From the result of the experiment, it is understood that the time length till the start of darkening is progressively increased as the composition ratio of Ge is increased, and is drastically prolonged when the composition ratio of Ge has exceeded 17 at %. Namely, when the Ge composition is increased beyond 17 at %, the darkening speed is reduced to make the composition practically unusable.

The light power density of the laser beam required for the start of whitening is decreased, i.e., the recording sensitivity is improved, as the composition ratio of Ge is increased. A practically acceptable sensitivity is obtained even with a small Ge composition ratio of 5 at %. This tendency is maintained when the Ge composition ratio ranges between 0 and 20 at %. However, if the Ge composition ratio is increased excessively, the melting point of the system is increased so that the sensitivity is lowered.

From these expriments, it was confirmed that, in the ternary alloy of Te-Ge-Au system in which the O composition ratio to the whole system is fixed at 20 at % and the ratio between Te and Au is selected to be 50:50, it is possible to obtain a high recording sensitivity and a high erasing speed, provided that the Ge composition ratio in the ternary alloy of Te-Ge-Au system is selected to range between 5 and 17%.

Figure 10:
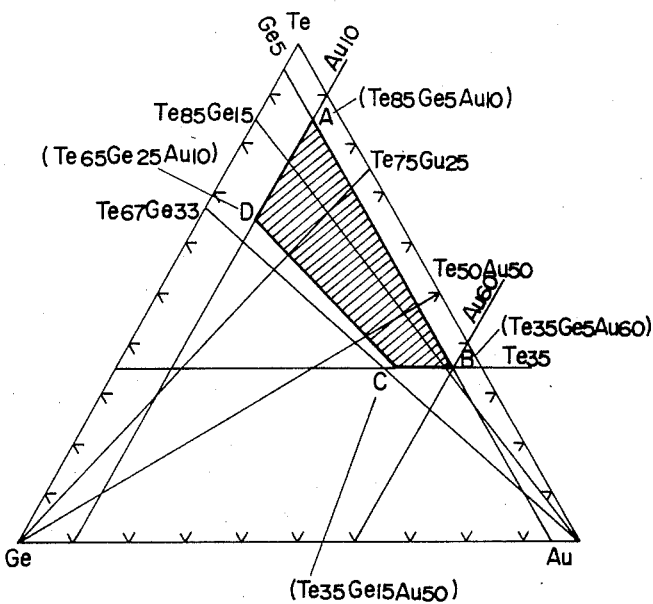
FIG. 10 is a triangular diagram showing preferred range of composition of a Te-O-Ge-Au system alloy used as the material of an optical information recording medium of the invention.

From the description of Embodiments 1 to 4, it will be seen that, in the recording medium made of a quadruple alloy of Te-O-Ge-Au system, a sufficiently high erasing speed and a sufficiently high recording sensitivity are obtainable when the composition ratio of O to the whole system is selected to be, for example, 20 at %, provided that the composition ratio of Te, Ge and Au is selected to fall within the hatched region defined by points A,B,C and D in FIG. 10.

An explanation will be made hereinunder as to the results of an experiment conducted on recording medium samples with varying O content while fixing composition ratio of Te, Ge and Au, as well as a moisture proof test conducted on these samples.

EMBODIMENT 5

Evaluation compositions were formed by a composition control such that the composition ratio of Te, Ge and Au becomes 65:10:25. Using this ternary alloy of Te$_{65}$Ge$_{10}$Au$_{25}$, recording medium samples were prepared by varying the ratio between this ternary system and O. The samples thus obtained were placed in a thermo-hygrostate of 40° C. and 90 RH % for about 1 month and the change in the optical transmittance was measured at 830 nm wavelength. The result of the measurement is shown in FIG. 11a.

Figure 11A:
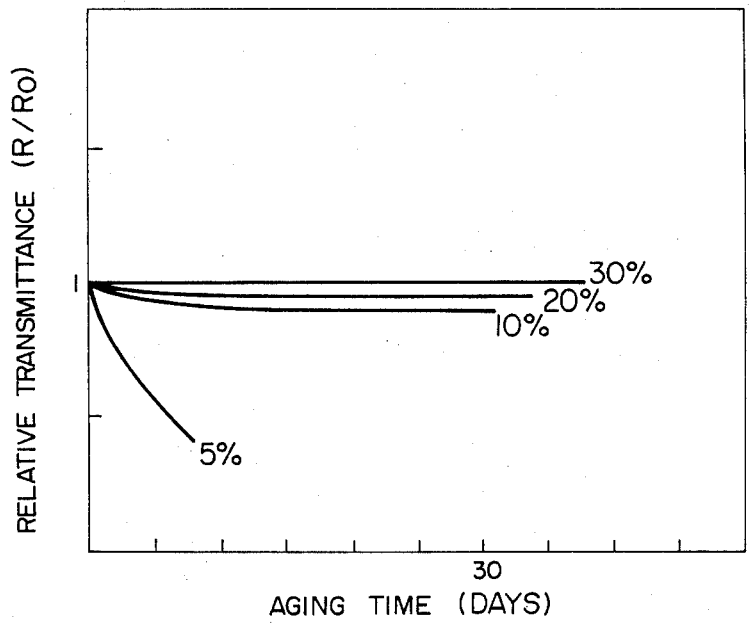
FIGS. 11a to 11c are graphs showing, respectively, the result of a moisture proof test, darkening property and whitening property caused by a change in O concentration in a recording medium made of Te-O-Au-Ge system alloy.

FIG. 11a shows that the transmittance is not changed substantially although a slight change is observed in the beginning period, provided that the O composition ratio is 10% or greater. It is considered that the oxygen in the film exists in the form of oxides such as TeO$_2$ and GeO$_2$, or a composite oxides of such oxides, through bonding to Te or Ge. Anyway, the oxygen is dispersed in such a form as to finely divide the fine grains such as Te, Te-Au, Te-Ge and Te-Ge-Au such as to suppress the crystallization and oxidation of these grains, thus ensuring a high moisture-proof property.

Figure 11B:
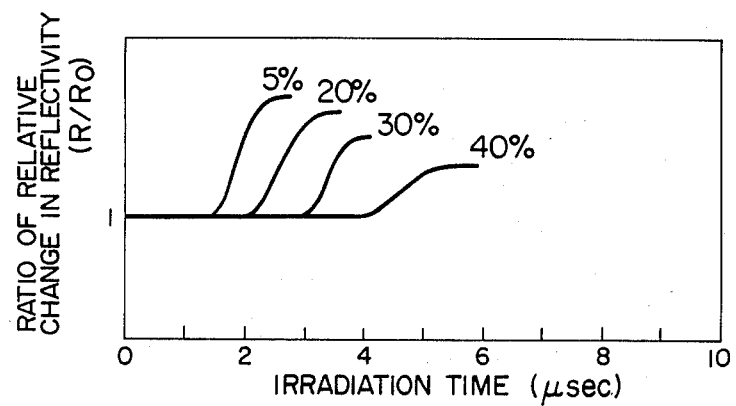
Figure 11C:
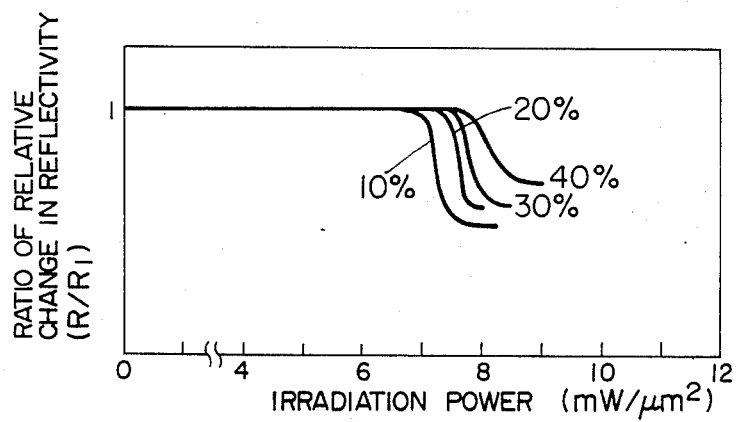

An explanation will be made hereinunder as to how the recording and erasing properties are changed in accordance with the change in the composition ratio of O. To investigate the change in the recording and erasing properties in relation to the composition ratio of O, the darkening and whitening properties were investigated in the same manner as Embodiment 1, using samples of the same lots as those subjected to the moisture proof test. FIGS. 11b and 11c show, respectively, the darkening property and whitening property as measured.

These Figures tell the following facts. Namely, the time length till the start of darkening is increased, while the reflectivity change ΔR is somewhat decreased, as the composition ratio of O is increased. This is attributable to a fact that the tendency for crystallization of Te is suppressed as the oxide content is increased. However, the composition is usable practically when the oxide content does not exceed 40%. The light power density of the beam required for the starting of whitening is not substantially affected by the composition ratio of O. However, an O composition ratio exceeding 40% undesirably allows the accumulation of heat due to lowering in the heat transfer coefficient, resulting in a tendency of easy breakdown of the film during repetitional recording and erasing. From these facts, it is understood that the composition ratio of O should be selected to range between 10 and 40 at %.

Hereinunder, a description will be made as to an embodiment applied to an optical disk.

EMBODIMENT 6

Figure 12:
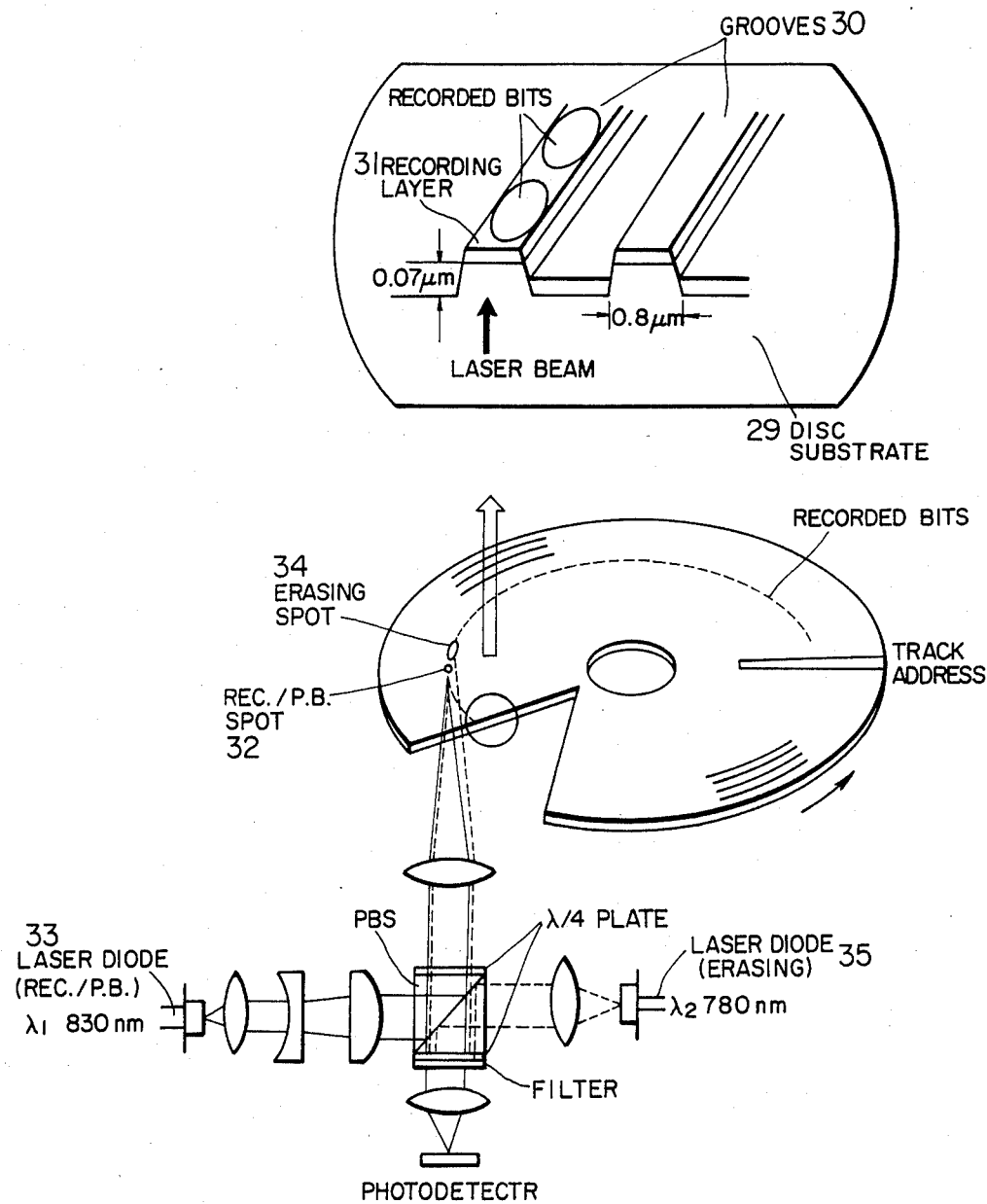
FIG. 12 is a schematic illustration of the construction of an optical disk in accordance with the invention and the construction of an evaluation optical system.

FIG. 12 shows an optical disk in accordance with the invention and an optical system of an evaluation system.

The disk has a substrate 29 made of a PMMA resin having a thickness of 1.2 mm and a diameter of 200 mm. An optical guide track of 700 Å A deep and 0.65 μm wide is formed on the disk concentrically. The guide track is covered with an $SiO_2$ protective film of 1000 Å thick formed by evaporation. A recording layer 31 of about 900 Å thick and having a composition consisting of $Te_{52}O_{20}Ge_8Au_{20}$ is formed on the protective layer by evaporation. The recording layer 31 in turn is covered with an $SiO_2$ protective film of 1000 Å thick formed by evaporation. Then, a layer of PMMA resin material which is the same as the material of the substrate is adhered to by a bond, thus completing the optical disk.

This optical disk was subjected to a recording and erasing test conducted in accordance with the method which is disclosed in P46, brochure of JAPAN DISPLAY, 1983. In the recording test, a laser beam emitted from a laser diode 33 having an oscillation wave length of 830 nm was focussed into a recording laser spot 32 having a circular cross-section of 0.9 μm. In the erasing test, a laser beam was emitted from a laser diode having an oscillation wavelength of 780 nm and was converged into a elliptical shaped spot 34 which has a peak half value width of 1μm×10 μm. Two laser spots were disposed in close proximity with each other on the same track by means of a common optical system. A test recording and erasing was conducted in an area of 150 φ diameter while rotating the disk at a speed of 1800 rpm (peripheral speed about 12 m/sec).

More specifically, a virgin track was darkened by applying the erasing laser at a total power of 12 mW, and then the recording laser modulated in a single frequency mode (f=5 MHz) was applied at a total power of 8 mW, thus recording signals at a C/N ratio of 55 dB. Then, the erasing laser beam and the recording laser beam were applied alternatingly for 100,000 cycles, but no substantial degradation of C/N ratio was observed.

An explanation will be made hereinunder as to embodiments which were formed by adding various additional elements to the described composition of Te-O-Ge-Au system. As will be explained later, the composition ratio of Au could be reduced advantageously by using Sn, In, Bi or Sb as an additive. This is because such an additive can produce an effect supplementary to the effects of Ge and Au. Embodiments which make use of Sn, In, Bi and Sb as additives will be described hereinunder.

First of all, an explanation will be made as to an embodiment in which the influence of the composition ratio of Au will be explained.

EMBODIMENT 7

As the material composition to be evaluated, a composition was formed with such a composition control as to obtain an atomic ratio of Te, Ge and M (M=Sn or In or Bi or Sb) of 75:10:15. Then, various ternary compositions consisting of the above-mentioned composition expressed as $Te_{75}Ge_{10}M_{15}$, Au and O were formed while controlling the composition ratios of Au and O, and recording medium samples were formed from these ternary compositions.

Figure 13A:
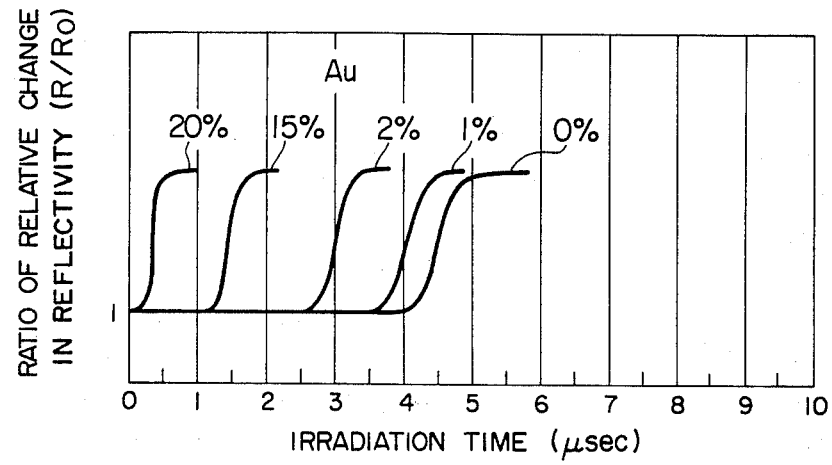
FIGS. 13Aa to 13Db are graphs showing the change in the recording and erasing properties caused by a change in Au content in different embodiments of optical information recording medium of the invention which are formed by adding, respectively, Sn, In, Bi and Sb as an additive to a Te-O-Ge system alloy.
Figure 13A:
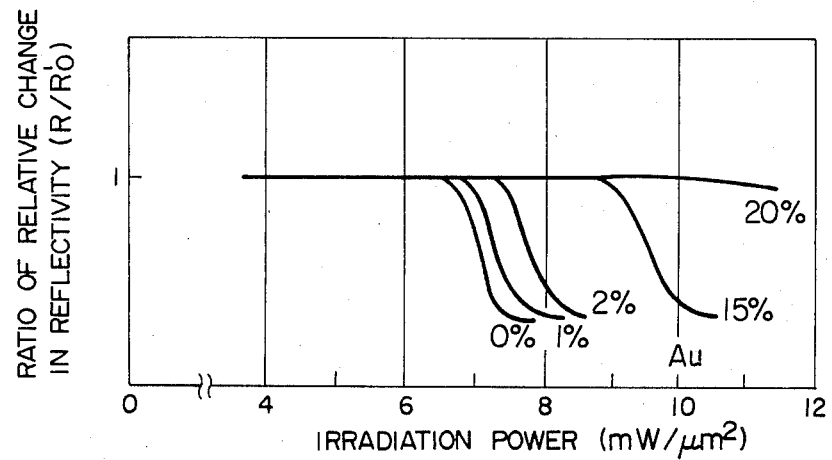

FIG. 13A$a$ shows the change in the irradiation time until the start of the darkening by an irradiation with a laser light power of 1 mW/μm², while varying the amount of addition of Au in the composition ($Te_{0.75}Ge_{0.1}Sn_{0.15})_{80}O_{20}$ i.e., $Te_{60}Ge_8Sn_{12}O_{20}$. From this Figure, it will be seen that the irradiation time till the darkening is started can be remarkably shortened by the addition of Au, and that the effect of the addition of Au becomes appreciable when the amount of addition of Au is increased beyond 2%.

Figure 13B:
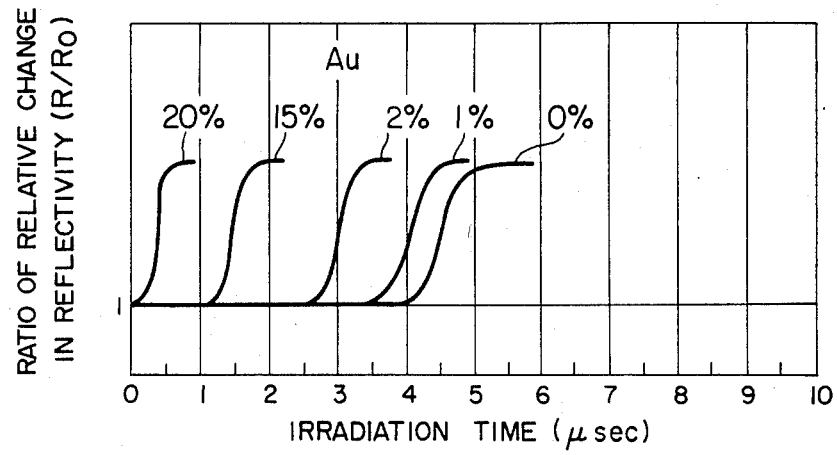
Figure 13B:
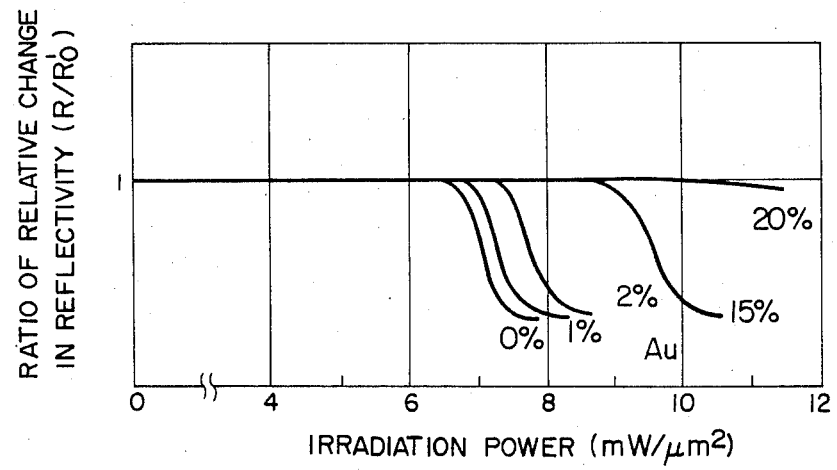
Figure 13C:
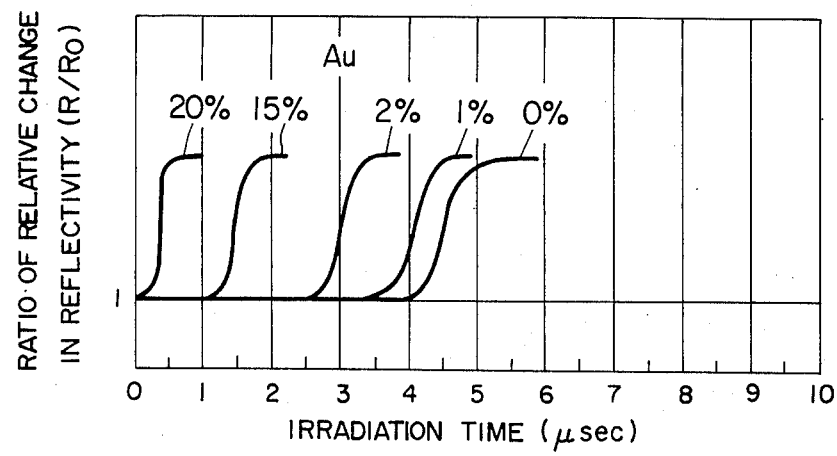
Figure 13C:
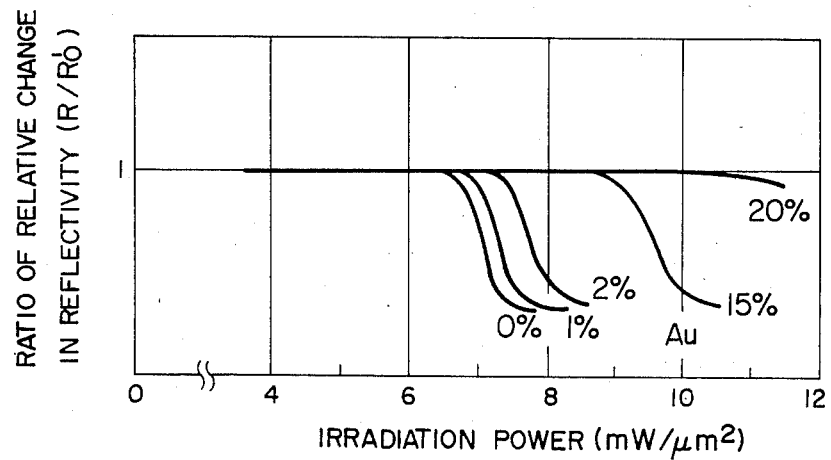
Figure 13D:
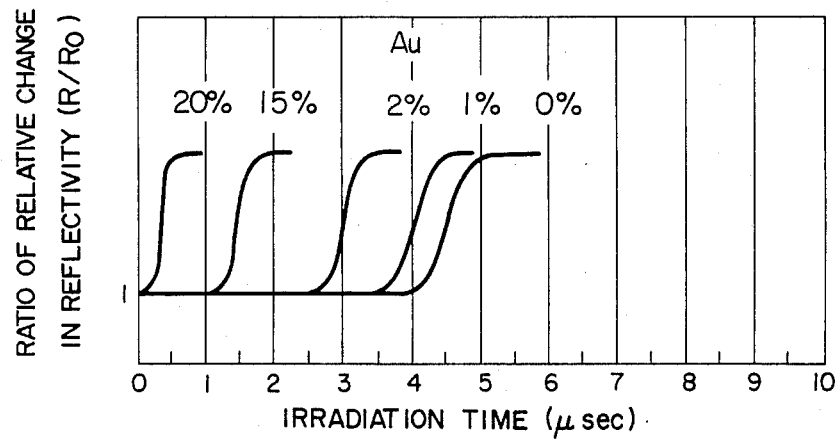
Figure 13D:
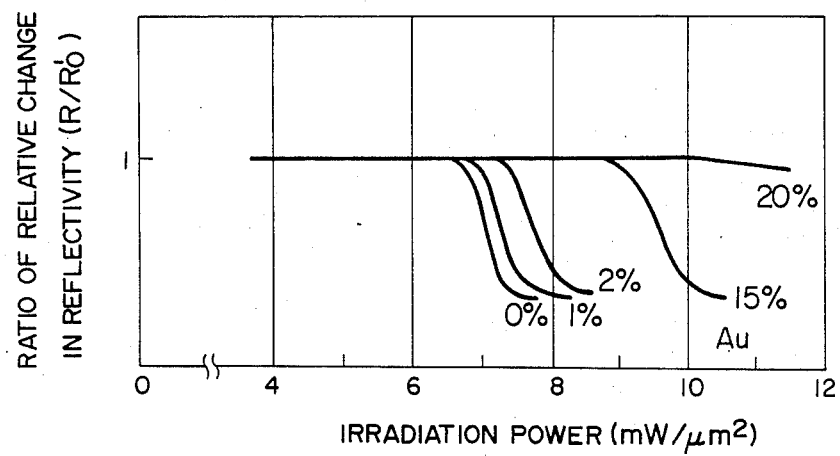

FIGS. 13B$a$, 13C$a$ and 13D$a$ show the results of the same test as above, conducted while varying the Au content in the compositions $Te_{60}Ge_8In_{12}O_{20}$, $Te_{60}Ge_8Bi_{12}O_{20}$ and $Te_{60}Ge_8Sb_{12}O_{20}$ which were obtained by substituting In, Bi and Sb, respectively, for the Sn in the above-explained test. From these Figures, it will be seen also that, in the compositions obtained by additing In, Bi and Sb as an additive in place of Sn, the irradiation time till the start of darkening can be remarkably shortened by the addition of Au, as in the case of the composition which employs Sn as the additive, and also that the effect of addition of Au becomes appreciable when the amount of addition of Au has exceeded 2%.

A laser beam of a power density of, for example, 1 mW/μm² was applied for 5 μsec on a recording medium of one of the above-mentioned compositions, e.g., $Te_{60}Ge_8Sn_{12}O_{20}$, such as to sufficiently darken the irradiated area, and the darkened area was then irradiated with a laser beam for a fixed period of 50 nsec at varying laser power density. The irradiation time till the start of whitening was measured with varying amount of addition of Au, the result of which is shown in FIG. 13A$b$. It will be seen that the irradiation beam power density necessary for the start of whitening is increased as a result of addition of Au but no substantial problem is caused when the amount of addition of Au is not greater than 15%. It will be seen also that the whitening is suppressed remarkably when the amount of addition of Au is 20%.

FIGS. 13B$b$, 13C$b$ and 13D$b$ show the results of the same tests conducted on the material of the system mentioned above, while substituting In, Bi and Sb, respectively, for Sn. In each case, the irradiation laser beam power density necessary for the start of whitening is increased as a result of the addition of Au but no substantial problem is caused when the amount of addition is not greater than 15% and that the whitening is remarkably suppressed when the amount of addition of Au is 20%, as in the case of the comoposition which employs Sn as the additive.

From these Figures, it will be understood that the materials which are formed by adding additives such as Sn, In, Bi and Sb, respectively, to the composition of Te-Ge-O-Au system satisfy the basic demands for the material of reversible optical information recording medium, and that the erasing speed can be increased by several times without impairing the recording performance as compared with the conventional material by selecting the amount of addition of Au such as to range between 2 and 15%.

In the measurement of the darkening property, it was confirmed that in all cases the curves are shifted to the left when the power density of the laser beam is increased. On the other hand, in the measurement of whitening property, it was confirmed that the curves are shifted to the left in all cases when the irradiation time is increased.

Similar experiments were conducted with materials of a system consisting of Te, Ge and an additive M (M=Sn or In or Bi or Sb) while varying the composition ratio of these three elements, the result of which will be described hereinunder.

EMBODIMENT 8

A composition control was conducted to such as to obtain a composition ratio of Te-Ge-M, Au and O of 70:10:20, and various compositions were obtained by varying the composition ratio of three elements in Te-Ge-M. Recording medium samples of different compositions were obtained by using these compositions.

Selecting Sn out of the additive elements mentioned above, and fixing the composition ratio of Sn in the ternary system of Te-Sn-Ge at 20%, the darkening starting temperature was measured in accordance with the method disclosed in Japanese Patent application No. 70229/1984, while varying the composition ratio of Ge. From FIG. 14A$a$ showing the result of the measurement, it will be seen that the darkening start temperature is increased such as to enhance the thermal stability of the whitened state, as a result of increase in the amount of addition of Ge. These samples were placed in a clean oven of 50° C. for the examination of the change in the transmittance. Although the samples exhibiting darkening temperature below 100° C. showed an appreciable decreasing in the transmittance in 24 hours, the samples having higher darkening temperature showed only a small change of transmissivity which is about 1% to the absolute value after one month. From this fact, it is understood that a sufficiently high thermal stability can be obtained when the addition of amount of Ge is at least 3%. An increase in the Ge content allows the film to withstand higher temperature, but is accompanied undesirably by a drastic increase in the transmittance, i.e., a large decreasing of absorption, resulting in a lowered darkening sensitivity. A sufficiently high darkening sensitivity was confirmed when the amount of addition of Ge ranges between 3 and 15%.

Figure 14A:
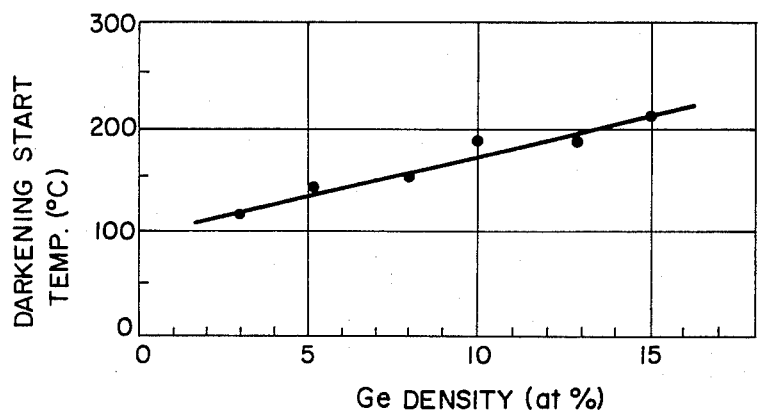
FIGS. 14Aa, 14Ab, 14Ba, 14Bb, 14Ca, 14Cb, 14Da and 14Db, respectively, are graphs showing the relationship between the Ge content and the darkening start temperature and the relationship between an additive content and the laser power required for the start of the whitening when one of Sn, In, Bi and Sb is added as additive to Te-O-Au-Ge system alloy used as the material of an optical information recording medium of the invention.
Figure 14A:
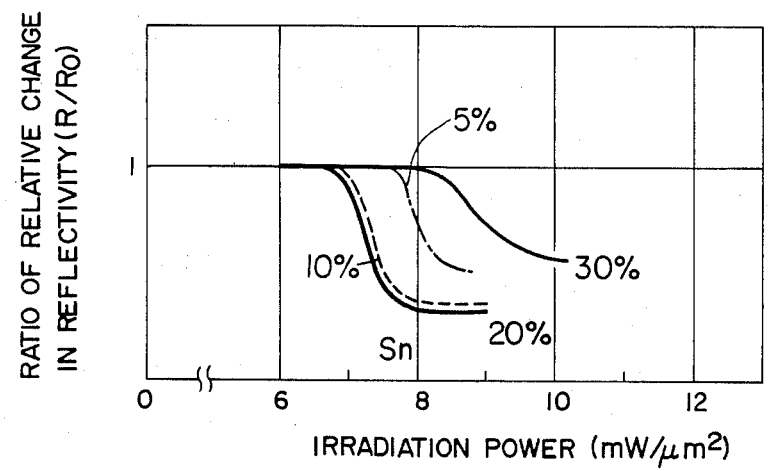
Figure 14B:
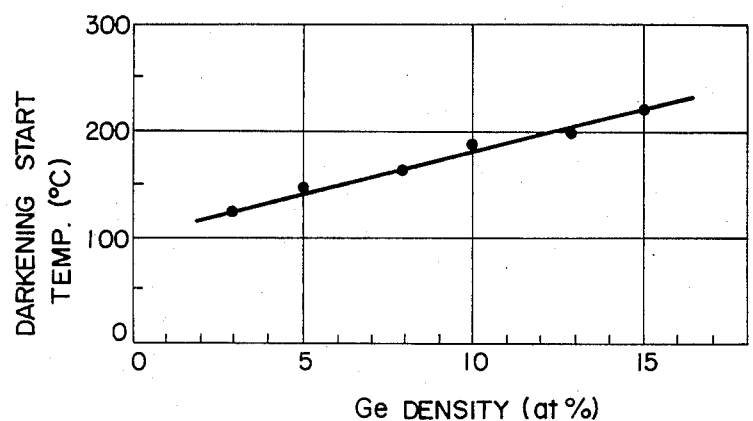
Figure 14B:
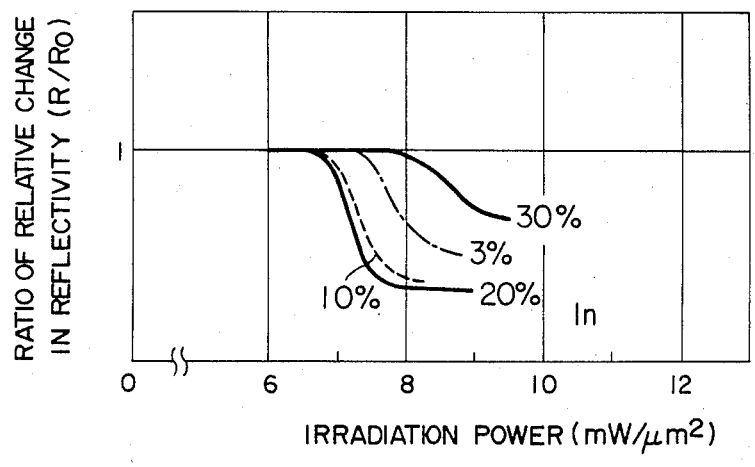
Figure 14C:
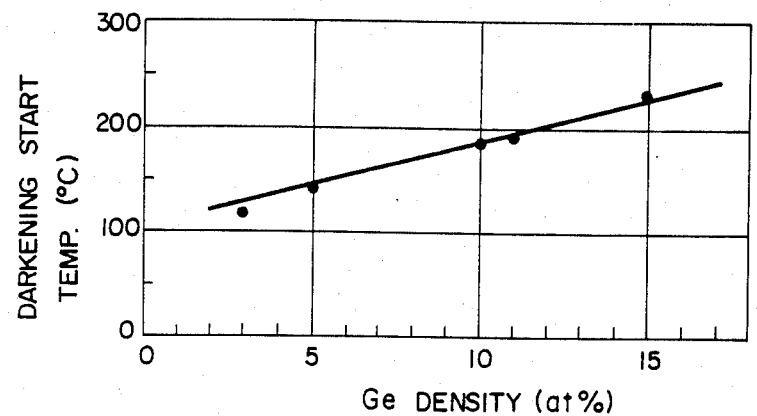
Figure 14C:
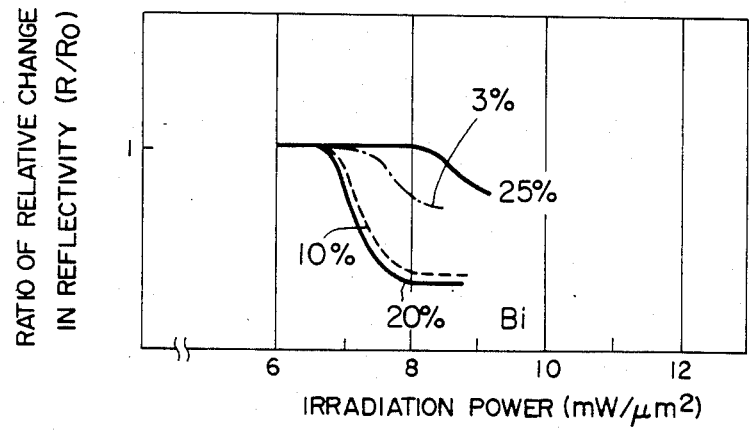
Figure 14D:
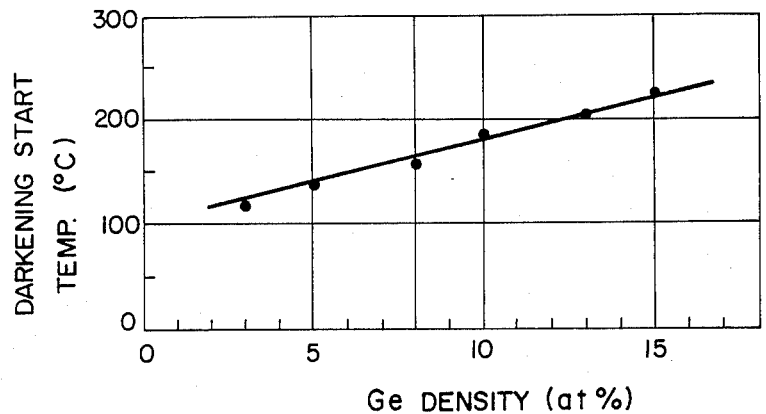
Figure 14D:
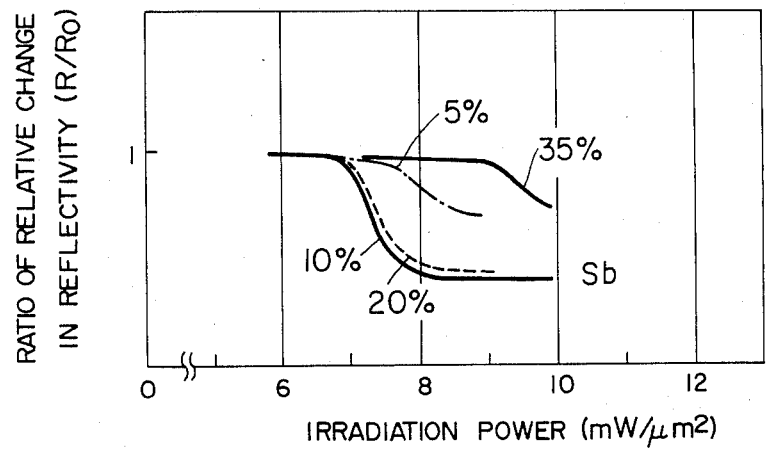
Figure 15A:
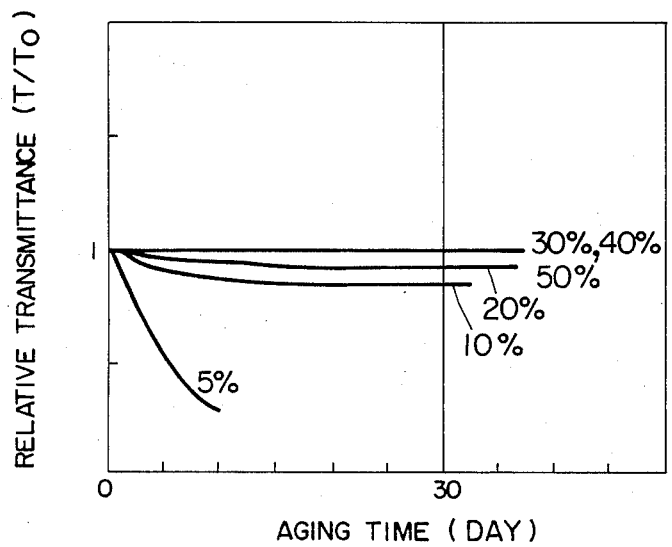
FIGS. 15A to 15D are graphs showing the relationship between the oxygen concentration and moisture proof property in an optical information recording medium of the invention made of a Te-O-Au-Ge system alloy with addition of Sn, In, Bi and Sb, respectively.
Figure 15B:
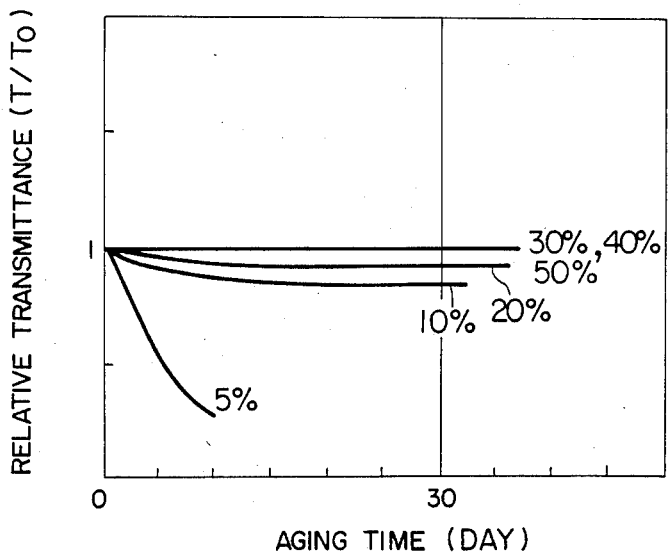
Figure 15C:
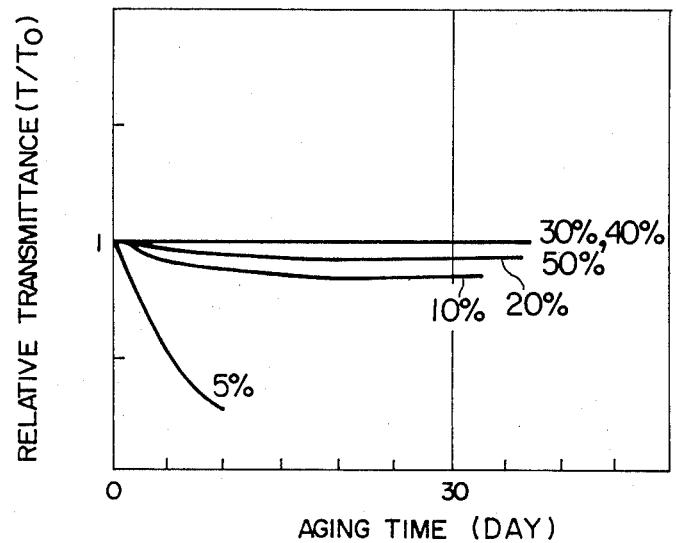
Figure 15D:
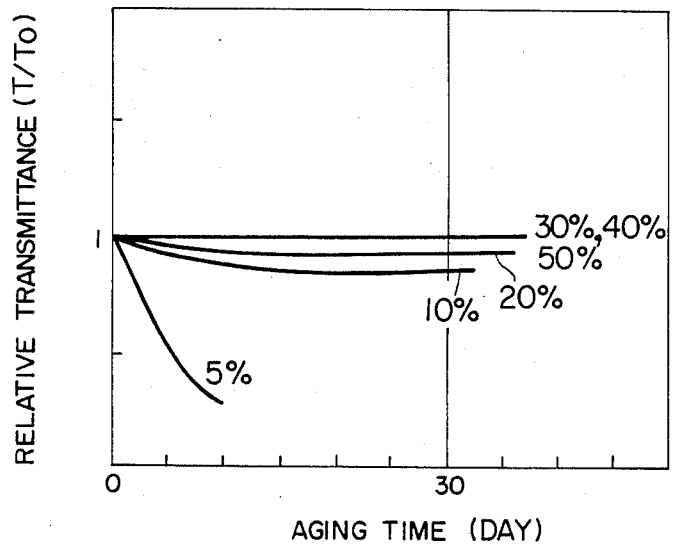

Similar tests were carried out by using In, Bi and Sb, respectively, as the additive element M, the results of which are shown in FIGS. 14B$a$, 14C$a$ and 14D$a$. From these Figures, it will be seen that the addition of Ge produce the same effect as that obtained with the use of Sn as the additive element M.

Using Sn as the additive element M and fixing the composition ratio of Ge in the ternary system of Te, Sn and Ge at 10%, an experiment was conducted to examine how the recording sensitivity is changed by a change in the amount of addition of Sn, using a laser beam pulse having a pulse width of 50 nsec. The result of this experiment is shown in FIG. 14A$b$. From this Figure, it will be seen that, when the amount of addition of Sn is about 5%, both the recording sensitivity and the reflectivity change are small, i.e., that the whitening is difficult to take place when the amount of addition of Sn is below 5%. It will be seen also that the recording sensitivity is somewhat decreased and the reflectivity is also reduced when the amount of addition of Sn reaches 30%, although a sufficiently high values of recording or whitening sensitivity are obtained when the amount of addition of Sn is 10% and 20%, respectively. As the amount of addition of Sn is further increased, the composition ratio of Te as the major element is reduced such as to impair the reversibility of the recording medium. It was confirmed also that, with this material, it is possible to obtain an erasing speed which is several times as high as that of the conventional material, by virture of addition of Au.

FIGS. 14B$b$, 14C$b$ and 14D$b$ show the results of similar experiments conducted by using In, Bi and Sb, respectively, in place of Sn as the additive element in the above-explained composition.

In the case where In is used as the additive element, when the amount of addition of In is about 3%, the recording sensitivity is rather low and the reflectivity change is small, i.e., the whitening is difficult to take place when the amount of addition of In is below 3%. It will be seen also that the recording sensitivity is somewhat decreased and the reflectivity is also reduced when the amount of addition of In reaches 30%, although a sufficiently high values of recording or whitening sensitivity are obtained when the amount of addition of In is 10% and 20%, respectively. As the amount of addition of In is further increased, the composition ratio of Te as the major element is reduced such as to impair the reversibility of the recording medium. It was confirmed also that, with this material, it is possible to obtain an erasing speed which is several times as high as that of the conventional material, by virtue of addition of Au.

In the case where Bi is used as the additive element, when the amount of addition of Bi is about 3%, the recording sensitivity is rather low and the reflectivity change is small, i.e., the whitening is difficult to take place when the amount of addition of Bi is below 3%. It will be seen also that the recording sensitivity is somewhat decreased and the reflectivity is also reduced when the amount of addition of Bi reaches 25%, although a sufficiently high values of recording or whitening sensitivity are obtained when the amount of addition of Bi is 10% and 20%, respectively. As the amount of addition of Bi is further increased, the composition ratio of Te as the major element is reduced such as to impair the reversibility of the recording medium. It was confirmed also that, with this material, it is possible to obtain an erasing speed which is several times as high as that of the conventional material, by virtue of addition of Au.

In the case where Sb is used as the additive element, when the amount of addition of Sb is about 5%, the recording sensitivity is rather low and the change in the reflection factor is small, i.e., the whitening is difficult to take place when the amount of addition of Sb is below 5%. It will be seen also that the recording sensitivity is somewhat decreased and the reflectivity is also reduced when the amount of addition of Sb reaches 35%, although a sufficiently high values of recording or whitening sensitivity are obtained when the amount of addition of Sb is 10% and 30%, respectively. As the amount of addition of Sb is further increased, the composition ratio of Te as the major element is reduced such as to impair the reversibility of the recording medium. It was confirmed also that, with this material, it is possible to obtain an erasing speed which is several times as high as that of the conventional material, by virture of addition of Au.

Optimum amounts or contents of elements in the composition with an additive element are thus clarified.

An explanation will be made hereinunder as to the result of an experiment conducted to examine the moisture-proof property of the recording medium in accordance with the invention.

EMBODIMENT 9

It has been known that the moisture-proof property of an oxide film based on a Te-TeO$_2$ system alloy is changed by a change in the oxygen concentration in the film. Therefore, an experiment was conducted by using samples consisting of alloy compositions Te$_{70}$Ge$_5$M$_{15}$Au$_{10}$ (M=Sn or In or Bi or Sb), while varying the oxygen concentration within the range of between 0 and 50%.

FIGS. 15A to 15D show the results of measurement of the change in the transmittance of the samples when the samples using Sn, In, Bi and Sb, respectively, were left for one month in a thermo-hygrostate of 40° C. and 90 RH %. From these Figures, it will be seen that, in all of these sample systems, the transmittance is not changed substantially if the oxygen concentration is 10% or higher although a slight reduction of transmittance is observed in the beginning period, and that the transmittance is not changed at all from the initial value when the oxygen concentration of 30% or higher. It is considered that the oxygen in the film is bonded to Te such as to exist in the form of TeO$_2$ or bonded to Ge, Sn, In, Bi or Sb such as to exist in the form of oxides GeO$_2$, SnO$_2$, In$_2$O$_3$, Bi$_2$O$_3$ or Sb$_2$O$_3$, or in the form of composite oxides thereof. Anyway, Te and oxygen co-exist in such a manner that the oxides divides the Te-system alloy. An excessive increase in the O content, however, reduces the heat conductivity of the system and tends to permit accumulation of heat when irradiated with a beam, often resulting in a breakdown of the film during repetitional recording and erasing. It was confirmed, however, that this problem can be overcome when the O content is less than 40%.

The results of the evaluation experiments described hereinbefore can be summarized as follows.

Figure 16:
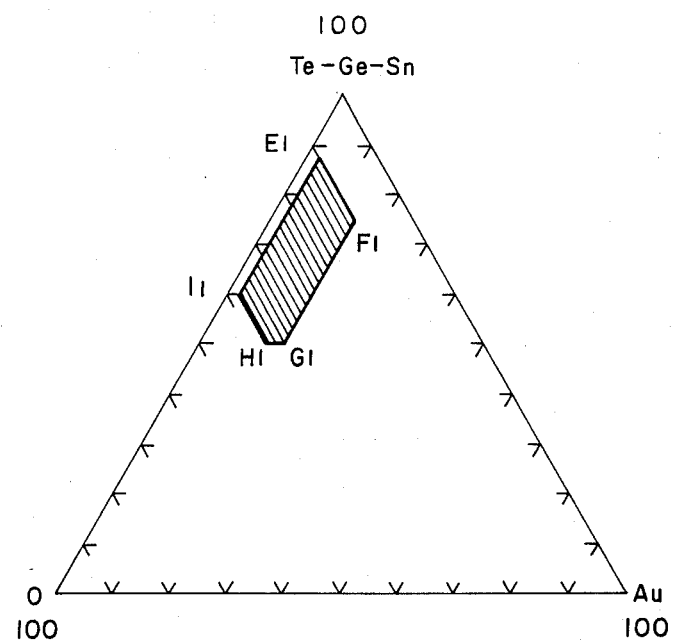
FIGS. 16 to 23 are triangular diagrams showing preferred ranges of composition of recording film in an optical information recording medium of the invention made of a Te-O-Au-Ge alloy when Sn, In, Bi and Sb, respectively, are added as additives.
Figure 17:
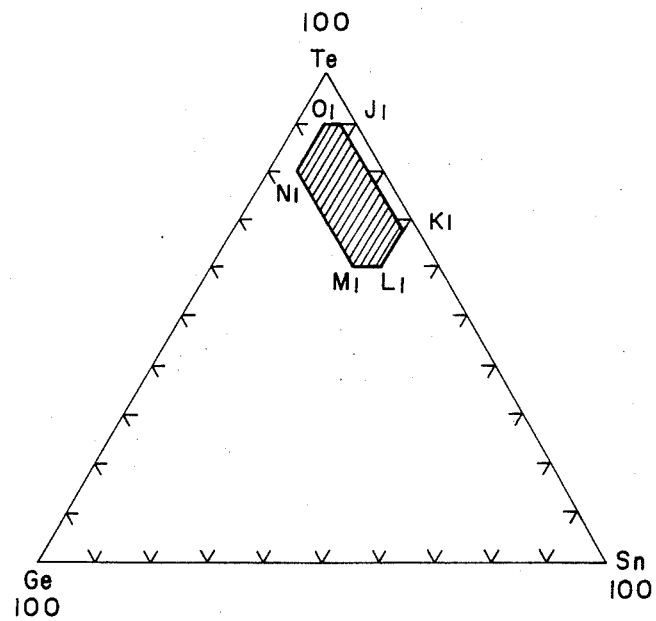

In case of the recording film of quintuple alloy of Te-O-Ge-Sn-Au system, a superior erasing property and highly stable recording property are obtainable when the composition ratio of three elements Te-Ge-Sn falls within the region defined by points J$_1$ to O$_1$ in FIG. 17, while the composition ratio of Te Ge Sn, Au and O falls within the range defined by points E$_1$ to I$_1$ in FIG. 16. A typical example of such composition is expressed by Te$_{60}$O$_{20}$Ge$_5$Sn$_{10}$Au$_5$.

The coordinate values of these points are shown below.

|  | Te—Ge—Sn | O | Au |
|---|---|---|---|
| E$_1$ | 88 | 10 | 2 |
| F$_1$ | 75 | 10 | 15 |
| G$_1$ | 50 | 35 | 15 |
| H$_1$ | 50 | 38 | 12 |
| I$_1$ | 60 | 38 | 2 |

|  | Te | Ge | Sn |
|---|---|---|---|
| J$_1$ | 90 | 5 | 5 |
| K$_1$ | 90 | 3 | 7 |
| L$_1$ | 67 | 3 | 30 |
| M$_1$ | 60 | 10 | 30 |
| N$_1$ | 60 | 15 | 25 |
| O$_1$ | 80 | 15 | 5 |

Figure 18:
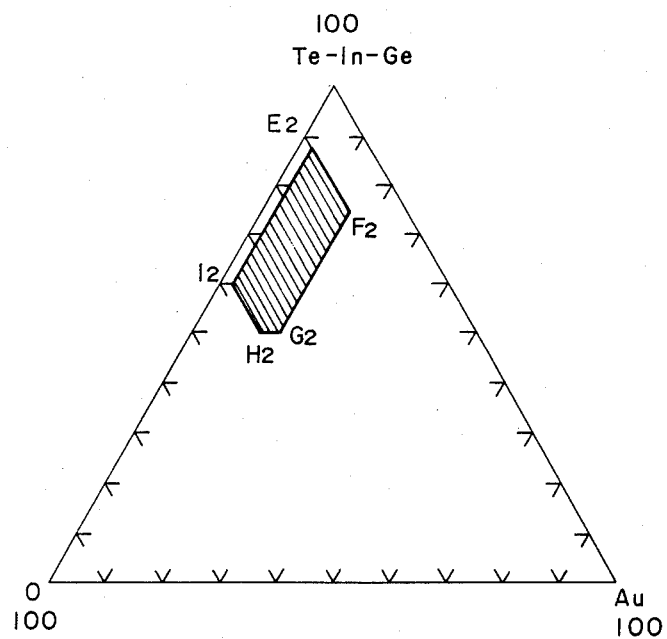
Figure 19:
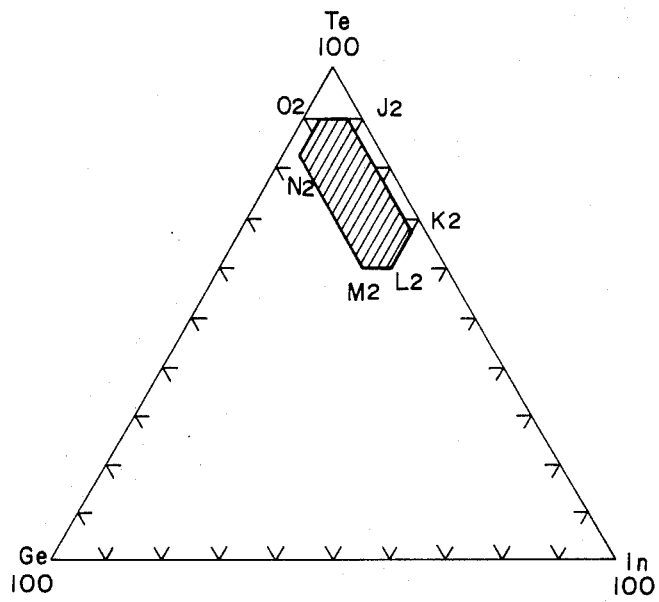

In case of the recording film of quintuple alloy of Te-O-Ge-In-Au system, a superior erasing property and highly stable recording property are obtainable when the composition ratio of three elements Te-Ge-In falls within the region defined by points J$_2$ to O$_2$ in FIG. 19, while the composition ratio of Te Ge In, Au and O falls withing the range defined by points E$_2$ to I$_2$ in FIG. 18. A typical example of such composition is expressed by Te$_{60}$O$_{20}$Ge$_5$In$_{10}$Au$_5$.

The coordinate values of these points are shown below.

|  | Te—Ge—In | O | Au |
|---|---|---|---|
| E$_2$ | 88 | 10 | 2 |
| F$_2$ | 75 | 10 | 15 |
| G$_2$ | 50 | 35 | 15 |
| H$_2$ | 50 | 38 | 12 |
| I$_2$ | 60 | 38 | 2 |

|  | Te | Ge | In |
|---|---|---|---|
| J$_2$ | 90 | 7 | 3 |
| K$_2$ | 90 | 3 | 7 |
| L$_2$ | 67 | 3 | 30 |
| M$_2$ | 60 | 10 | 30 |
| N$_2$ | 60 | 15 | 25 |
| O$_2$ | 82 | 15 | 3 |

Figure 20:
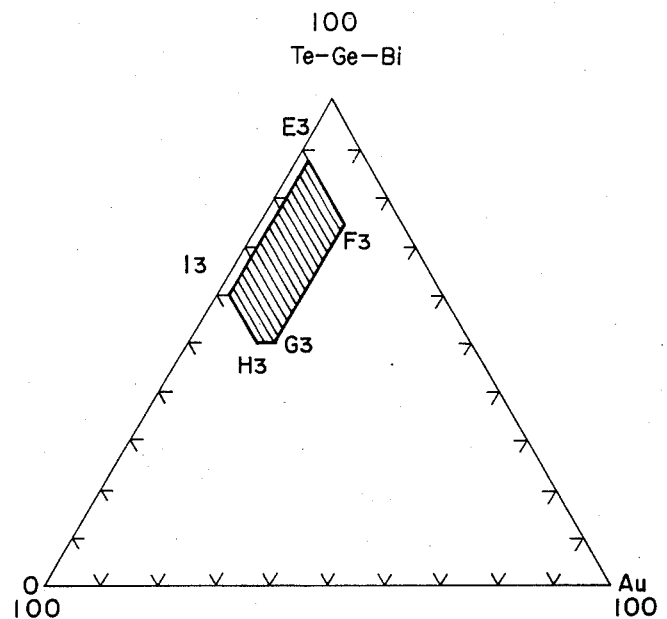
Figure 21:
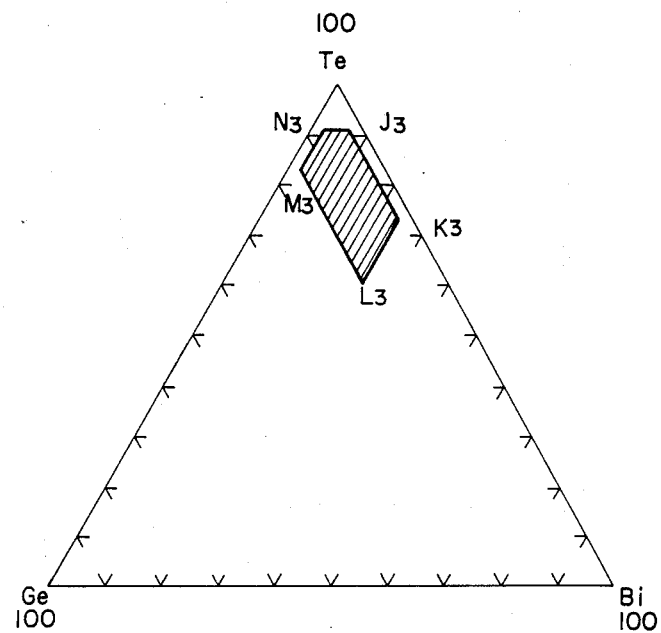

In case of the recording film of quintuple alloy of Te-O-Ge-Bi-Au system, a superior erasing property and highly stable recording property are obtainable when the composition ratio of three elements Te-Ge-Bi falls within the region defined by points J$_3$ to N$_3$ in FIG. 21, while the composition ratio of Te Ge Bi, Au and O falls within the range defined by points E$_3$ to I$_3$ in FIG. 20. A typical example of such composition is expressed by Te$_{60}$O$_{20}$Ge$_5$Bi$_{10}$Au$_5$.

The coordinate values of these points are shown below.

|  | Te—Ge—Bi | O | Au |
|---|---|---|---|
| E$_3$ | 88 | 10 | 2 |
| F$_3$ | 75 | 10 | 15 |
| G$_3$ | 50 | 35 | 15 |
| H$_3$ | 50 | 38 | 12 |
| I$_3$ | 60 | 38 | 2 |

|  | Te | Ge | Bi |
|---|---|---|---|
| J$_3$ | 92 | 5 | 3 |
| K$_3$ | 92 | 3 | 5 |
| L$_3$ | 72 | 3 | 25 |
| M$_3$ | 60 | 15 | 25 |
| N$_3$ | 72 | 15 | 3 |

Figure 22:
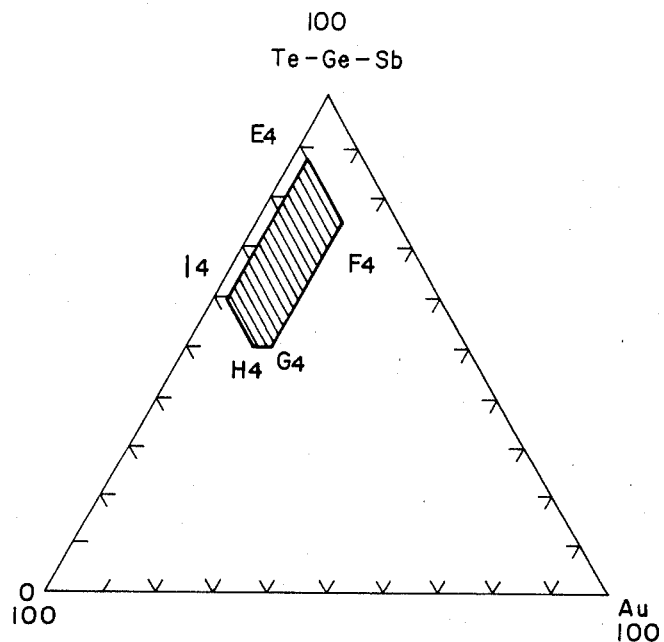
Figure 23:
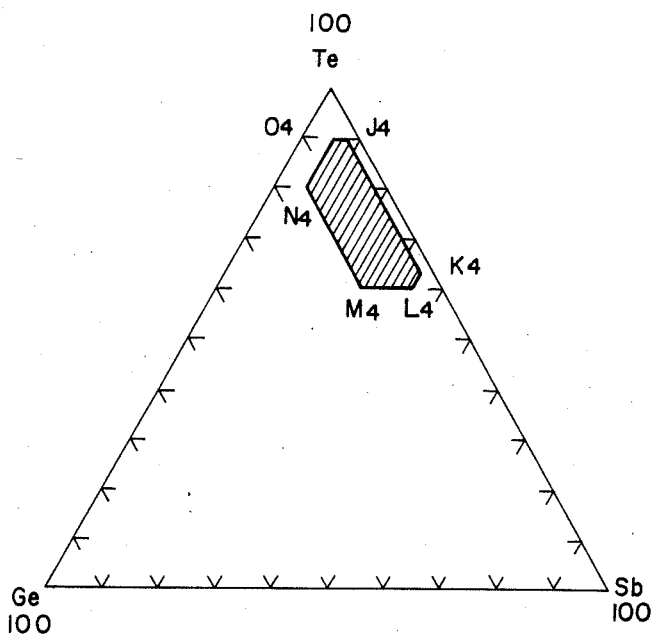

In case of the recording film of quintuple alloy of Te-O-Ge-Sb-Au system, a superior erasing property and highly stable recording property are obtainable when the composition ratio of three elements Te-Ge-Sb falls within the region defined by points J$_4$ to O$_4$ in FIG. 23, while the composition ratio of Te Ge Sb, Au and O falls within the range defined by points E$_4$ to I$_4$ in FIG. 22. A typical example of such composition is expressed by Te$_{60}$O$_{20}$Ge$_5$Sb$_{10}$Au$_5$.

The coordinate values of these points are shown below.

|       | Te—Ge—Sb | O  | Au |
|-------|----------|----|----|
| E4    | 88       | 10 | 2  |
| F4    | 75       | 10 | 15 |
| G4    | 50       | 35 | 15 |
| H4    | 50       | 38 | 12 |
| I4    | 60       | 38 | 2  |

|       | Te | Ge | Sb |
|-------|----|----|----|
| J4    | 90 | 5  | 5  |
| K4    | 90 | 3  | 7  |
| L4    | 62 | 3  | 35 |
| M4    | 60 | 5  | 35 |
| N4    | 60 | 15 | 25 |
| O4    | 80 | 15 | 5  |

An explanation will be made hereinunder as to the quadruple alloy of Te-O-Au-Se system. As explained before, the addition of Se as an additive element produces a result which is somewhat different from that produced by the addition of Ge. Namely, Se can form solid solution with Te perfectly at any ratio, so that Se does not cause any rise of the melting temperature or formation of crystallization nuclides even when its amount is large, unlike other additive elements. Thus, amount of addition of Se can be selected over a wider range than Ge.

An explanation will be made hereinunder as to the optimum composition range of the recording film employing Se, as well as the reasons of limitation of the contents of respective elements, through description of Embodiments 10 to 12.

The explanation will be commenced first with the optimum amounts of addition of Au and Se to TeOx. It was confirmed that the effect of addition of Au and Se does not become appreciable unless the total of amounts of addition of Au and Se to the TeOx film exceeds 10 at %. On the other hand, when the sum of number of atoms of Au and Se in the recording film exceeds 40 at %, the difference in the optical constants (refractive index and extinction coefficient) between the white and black states becomes impractically small as a result of relative reduction of the amount of Te, resulting in a small change in the reflectivity. At the same time, the levels of power of the laser beams for the darkening and whitening are increased impractically. Au and Se in TeOx acts contrarily to each other, so that, if the amount of addition of Au is increased, it is necessary to increase also the amount of addition of Se. Thus, the composition ratio Au/Se is one of the important factors which is to be limited. It was found that, in order to obtain sufficient darkening and whitening properties, the Au/Se ratio should range between 0.5 and 5.

The function of O in the recording film of TeOx system, i.e., the function of $TeO_2$, is considered to reside in the prevention of growth of fine Te crystal grains at normal temperature level, as well as prevention of oxidation of Te under the presence of steam. It was confirmed that, in the recording film of the invention containing Se, the O concentration should be at least 10 at %, from the view point of stability. The total content of Te should be large enough to form sufficient amount of Te crystals, besides the Te which is contained in the form of $TeO_2$. It was confirmed that, in the recording film in accordance with the invention, the Te content must be at least 35 at %, in order to sufficiently high recording sensitivity and sufficiently large change in the optical density of the recoridng film.

The recording film prepared to meet the above-described requirements can show an easy phase change between white and dark states, as well as a large amount of change in the reflectivity, even with a comparatively low level of power of laser beam applied. Such a recording film can be considered as being sufficiently practical also from the view point of stability, insofar as it is used at the normal temperature. However, in order to allow the recording film to withstand the use at higher temperature region, it has been confirmed that the addition of small amount of Ge is effective. One of the reasons of deterioration of the recorded signal is that the fine Te crystal grains tends to grow into greater size due to a temperature-degradation when the film is left for a long time, i.e., an inevitable darkening of the whitened area. It is considered that Ge is effective in raising the transition start temperature at which the fine Te cyrstal grains start to grow. This effect of addition of Ge is appreciable even when the amount of addition of Ge is as small as 1 at %. On the conyrary, when the amount of addition exceeds 10 at %, the transition start temperature rises excessively so that an impractically large power of laser beam is required both for darkening and whitening.

It has been found also that a further improvement in the darkening sensitivity is attainable by addition of small amount of an element such as Sn, Sb, Bi, In, Pb and Zn to the recording film of Te-O-Se-Au system alloy. A large effect of addition of such element was observed particularly when Sn, Sb, Bi or In was used as the additive element. It has been often observed that, when the amount of addition of Au in the recording film of Te-O-Se-Au system is increased for the purpose of improving the darkening sensitivity, the whitening sensitivity is reduced undesirably. According to the invention, however, it has been confirmed that the darkening sensitivity can be improved without being accompanied by a reduction in the whitening sensitivity, provided that an additive element such as Sn, Sb, Bi or In is added by a small amount, e.g., 5 to 20 at %.

The additive element such as Sn, In, Bi or Sb, when added to the alloy of Te-O-Se-Au system, produces an effect which is different from that produced by the addition of the same additive element such as Sn, In, Bi or Sb to the Te-Ge-Au-O system alloy explained in the description of preceding embodiments. Namely, in the case of the Te-Se-Au-O-M system alloy (M=Sn, In, Bi or Sb), Se is added for the purpose of increasing the recording sensitivity (whitening sensitivity) and Au is added for the purpose of increasing the erasing speed (darkening speed), so that it is not necessary to add Sn specifically for such purposes. In contrast, in the case of the Te-O-Se-Au system alloy, an appreciable increase in the darkening sensitivity is obtained by addition of Sn or other additive element. This may be atrributed to the fact that, as explained before in the SUMMARY OF THE INVENTION, the Sn or the like additive element, when added in excess of an amount matching for the amount of Te, comes out of the Te network structure such as to form crystallization nuclides and to serve as the light absorption center while increasing the light absorption efficiency.

The reasons of limitation of contents will be explained hereinunder through description of the embodiments.

EMBODIMENT 10

Using an electron beam evaporation apparatus which is capable of evaporating from 4 (four) sources, $TeO_2$, Te, Se and Au were evaporated from respective sources and deposited onto the surface of pieces of substrate of an acrylic resin of 10 mm long, 2.0 mm wide and 1.2 mm thick, thus forming samples. The evaporation was conducted under a vacuum of $1 \times 10^{-5}$ Torr and the film thickness was 1200 Å. The deposition rates from respective sources were varied in order to control the ratio of atom numbers of Te, O, Se and Au in the film.

The samples thus formed were subjected to an Auger electron spectroscopy (referred to as "AES", hereinunder) for the purpose of elementary analysis. At the same time, the darkening property and whitening property of these samples were examined by the method explained in connection with FIGS. 4 and 5, using the same system as that shown in FIG. 3. The measurement of the darkening property was conducted by measuring the time length till the darkening completion, using a laser beam of a power density of about 1 mW/$\mu m^2$ on the film surface.

On the other hand, the whitening property was measured by a process having the steps of darkening the sample film by applying a laser beam of a power density of 1 mW/$\mu m^2$ for 15 $\mu$sec, applying short beam pulses of about 50 nsec to the darkened area, and measuring the light power density $P_1$ required for the whitening.

The result of the AES elementary analysis, as well as the results of measurement of the darkening and whitening properties are shown in the following Table 1. Table 1 shows also the result of the moisture proof test. The moisture proof test was conducted by keeping the samples for one month in the atmosphere of 40° C. and 90 RH % and then measuring the change in the optical transmittance at 830 nm wavelength. The samples which showed a transmittance changing ratio of less than 5% are marked at o, while samples which showed a changing ratio exceeding 5% are marked at x. It is considered that the large change in the transmittance is atrributable mainly to oxidation of Te.

The results of the tests explained in the description of this embodiment were evaluated as compared with the results of dynamic disk evaluation which will be explained later in connection with Emboidment 13. As a result, it was confirmed that the recording film of this embodiment shows practically satisfactory performance even in view of the dynamic disk evaluation, on condition of $T_1 \leq 1.5$ $\mu$sec, $P_1 \leq 7$ mW/$\mu m^2$ and $\Delta R_0 \approx \Delta R_1 \geq 10\%$.

TABLE 1

| Sample No. | Result of AES elementary analysis | | | | | Darkening property | | Whitening property | | Moisture-proof property |
|---|---|---|---|---|---|---|---|---|---|---|
| | Te | O | Se (at %) | Au | Au/Se | $T_1$ ($\mu$sec) | $\Delta R_0$ (%) | $P_1$ (mW/$\mu m^2$) | $\Delta R_1$ (%) | 40° C. 90% RH one month |
| 1 | 59 | 26 | 0 | 15 | — | 0.6 | 23 | — | 0 | o |
| 2 | 60 | 24 | 16 | 0 | 0 | 8 | 15 | 5 | 15 | o |
| 3 | 61 | 17 | 3 | 19 | 6.3 | 0.7 | 22 | at least 10 | 15 | o |
| 4 | 60 | 17 | 4 | 19 | 4.8 | 0.7 | 23 | 10 | 21 | o |
| 5 | 63 | 15 | 6 | 16 | 2.7 | 0.8 | 19 | 8 | 18 | o |
| 6 | 59 | 20 | 7 | 14 | 2.0 | 0.9 | 20 | 6.5 | 20 | o |
| 7 | 63 | 19 | 7 | 11 | 1.6 | 1.1 | 18 | 6 | 18 | o |
| 8 | 62 | 18 | 9 | 11 | 1.2 | 1.2 | 19 | 6.5 | 19 | o |
| 9 | 58 | 20 | 11 | 11 | 1.0 | 1.3 | 17 | 5.5 | 17 | o |
| 10 | 61 | 20 | 11 | 8 | 0.7 | 1.7 | 17 | 6 | 17 | o |
| 11 | 60 | 18 | 15 | 7 | 0.5 | 4 | 15 | 6 | 15 | o |
| 12 | 63 | 18 | 15 | 4 | 0.3 | 6 | 15 | 5.5 | 15 | o |
| 13 | 70 | 24 | 2 | 4 | 2.0 | 5 | 18 | at least 10 | 12 | o |
| 14 | 69 | 21 | 4 | 6 | 1.5 | 2.5 | 17 | 8 | 15 | o |
| 15 | 64 | 21 | 5 | 10 | 2.0 | 1.3 | 19 | 6.5 | 18 | o |
| 16 | 57 | 18 | 10 | 15 | 1.5 | 0.9 | 20 | 6 | 20 | o |
| 17 | 56 | 15 | 12 | 17 | 1.4 | 1.1 | 19 | 7 | 19 | o |
| 18 | 49 | 16 | 15 | 02 | 1.3 | 1.7 | 15 | 7 | 14 | o |
| 19 | 45 | 14 | 16 | 25 | 1.6 | 2.2 | 12 | 10 | 12 | o |
| 20 | 38 | 13 | 21 | 28 | 1.3 | 3 | 8 | at least 10 | 6 | o |
| 21 | 32 | 51 | 6 | 11 | 1.8 | 2 | 7 | 9 | 7 | o |
| 22 | 36 | 46 | 7 | 11 | 1.6 | 1.5 | 11 | 7 | 10 | o |
| 23 | 43 | 38 | 9 | 10 | 1.1 | 1.1 | 15 | 7 | 14 | o |
| 24 | 55 | 25 | 8 | 12 | 1.5 | 1.1 | 17 | 6 | 17 | o |
| 25 | 72 | 15 | 6 | 7 | 1.2 | 1.7 | 20 | 7 | 20 | o |
| 26 | 79 | 10 | 5 | 6 | 1.2 | 1.8 | 22 | 7.5 | 22 | o |
| 27 | 82 | 7 | 5 | 6 | 1.2 | 1.7 | 23 | 8.5 | 22 | x |
| 28 | 82 | 11 | 3 | 4 | 1.3 | 2.2 | 23 | 10 | 23 | o |
| 29 | 80 | 5 | 6 | 9 | 1.5 | 1.5 | 25 | 7.5 | 25 | x |

It is assumed here that an excellent darkening property is defined as being such a property that the darkening is completed and a changing ratio $\Delta R_0$ of at least 10% is obtained by irradiation with laser beam of power density of 1 mW/$\mu m^2$ for 5 $\mu$sec. It is also assumed that such a whitening property that allows a complete whitening with laser beam pulse of 50 nsec and power density below 10 mW/$\mu m^2$, as well as a reflectivity changing ratio $\Delta R_1$ of at least 10%, is evaluated as being excellent. As to the moisture proof property, such a property as not to allow substantial moisture-degradation after one month preservation in the atmosphere of 40° C. and 90 RH % is evaluated as being excellent.

From Table 1, it will be seen that the excellent darkening property, whitening property and moisture proof property can be obtained when the following conditions are met:

$10 \leq Au + Se \leq 40$ at %, $0.5 \leq Au/Se \leq 5$; and $35 \leq Te \leq 80$ at %.

The excellent moisture proof property requires also that the condition of $O \geq 10$ at %.

When the condition of $15 \leq Au + Se \leq 30$ at % and $1 \leq Au/Se \leq 2$ are met, the minimum darkening time $T_1$ of not longer than 1.5 μsec and the minimum whitening power density of not greater than 7 mw/μm² are obtained, thus ensuring best darkening and whitening properties.

Figure 24:
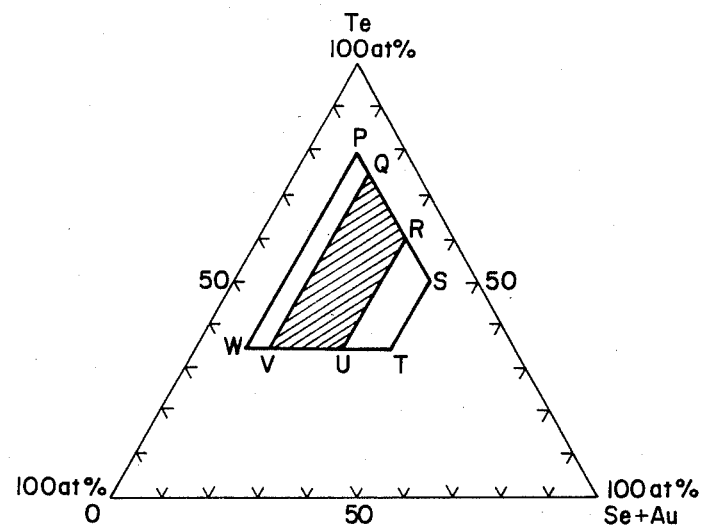
FIG. 24 is a triangular diagram showing preferred range of composition of a thin film of Te-O-Se-Au system alloy in an optical information recording medium of the invention.

To sum up, it is understood that, in the quadruple alloy of Te-O-Se-Au system, superior recording and erasing performance are obtained proveded that the composition ratio of Te, (Se+Au) and O falls within the region defined by points P, S, T and W in the triangular diagram shown in FIG. 24, and that the composition ratio Au/Se ranges between 0.5 and 5, and the best result is obtained when the composition ratio of Te, (Se+Au) and O falls within the region defined by points Q, R, U and V, while the composition ratio Au/Se ranges between 1 and 2.

EMBODIMENT 11

The AES elementary analysis and the measurement of the darkening, whitening and moisture proof properties were carried out in the same way as Embodiment 10. The heat resistance property was measured by keeping the sample films for 24 hours at each of temperatures 50° C., 70° C. and 90° C. The samples which showed no change in the transmittance at all are marked at o, while sample films which showed a change in the transmittance more or less are marked at x.

From this embodiment, it will be seen that the heat resistance property of the recording film can be improved considerably by addition of a small amount of Ge to the film material. In particular, an appreciable improvement in the heat resistance property is attained without being accompanied by any degradation in the darkening and whitening properties, when the condition of $1 \leq Ge \leq 10$ at % is met.

TABLE 2

| Sample No. | Result of AES elementary analysis (at %) | | | | | | Darkening property | | Whitening property | | Moisture-proof property 40° C. 90% RH 1 month | Heat-resistance property 24 Hr | | |
|---|---|---|---|---|---|---|---|---|---|---|---|---|---|---|
| | Te | O | Se | Au | Ge | Ay/Se | $T_1$ (μsec) | $\Delta R_0$ (%) | $P_1$ (mW/μm²) | $\Delta R_1$ (%) | | 50° C. | 70° C. | 90° C. |
| 30 | 63 | 19 | 7 | 11 | 0 | 1.6 | 1.1 | 18 | 6 | 18 | o | o | x | x |
| 31 | 61 | 18 | 8 | 12 | 1 | 1.5 | 1.0 | 20 | 6.5 | 18 | o | o | o | x |
| 32 | 61 | 19 | 7 | 10 | 3 | 1.4 | 1.1 | 18 | 6 | 17 | o | o | o | o |
| 33 | 60 | 17 | 6 | 10 | 7 | 1.7 | 1.2 | 18 | 7 | 18 | o | o | o | o |
| 34 | 60 | 15 | 6 | 9 | 10 | 1.5 | 1.4 | 17 | 7 | 16 | o | o | o | o |
| 35 | 57 | 14 | 7 | 9 | 13 | 1.3 | 2.0 | 18 | 9 | 17 | o | o | o | o |
| 36 | 54 | 12 | 8 | 13 | 13 | 1.6 | 3.2 | 17 | at least 10 | 12 | o | o | o | o |

Using an electron beam evaporation apparatus which is capable of evaporating four sources, Te-TeO₂, Se, Au and Ge were simultaneously evaporated from respective sources and deposited onto pieces of substrate made of an acrylic resin, each substrate piece being 10 mm in length, 2.0 mm in width and 1.2 mm in thickness.

An explanation will be made as to the method for evaporating both Te and TeO₂ from a common evaporation source.

As the starting material, a mixture containing 85 wt % of TeO₂ and 15 wt % of Al was prepared by using a small quantity of alcohol. Then, 25 g of powder of this mixture was placed on a quartz boat and was fired in an electric oven at a temperature of 700° C. while circulating N₂ gas, such as to reduce a part of TeO₂. The fired material was crushed and pressed to form a pellet which is used as the source.

Using these evaporation source materials, the evaporation was conducted to form sample silms under the same condition as Embodiment 10. The deposition rates from respective sources were adjusted for the purpose of control of the numbers of atoms of Te, O, Se, Au and Ge.

The sample films thus formed were subjected to an AES elementary analysis, as well as to measurement of darkening property, whitening property, moisture proof property and heat resistant property. The results of the analysis and measurement are shown in Table 2.

EMBODIMENT 12

Using an electron beam evaporating apparatus which is capable of evaporating from four sources, Te-TeO₂, Se, Au and Sn (or Sb, Bi or In) were simultaneously evaporated from respective sources and deposited on substrate pieces of an acrylic resin, each piece being 10 mm in length, 2.0 mm in width and 1.2 mm in thickenss, under the same evaporating condition as Embodiment 11. The deposition rates from respective sources were varied in order to control the ratio of numbers of atoms of Te, O, Se, Au, Sn (or Sb, Bi, In) in the recording film.

The sample films thus formed were subjected to an AES elementary analysis, as well as to measurement of darkening, whitening and heat-resistant properties, the results of which are shown in Table 3. The analysis and measurement were conducted in the same way as Embodiment 11.

From this embodiment, it will be understood that the darkening property can be improved appreciably without being accompanied by substantial degradation in the whitening property, by an addition of small amount of Sn (or Sb, Bi or In) in the recording film. In particular, a remarkable improvement in the darkening property is achieved without degrading the whitening property at all, when the condition of $5 \leq Sn$ (or Sb, Bi or In)$\leq 20$ at % is met.

TABLE 3

| Sample No. | Result of AES elementary analysis (at %) | | | | | | Darkening property | | Whitening property | | Moisture-proof property 40° C. 90% RH 1 month |
|---|---|---|---|---|---|---|---|---|---|---|---|
| | Te | O | Se | Au | Sn | Au/Se | $T_1$ (μsec) | $\Delta R_0$ (%) | $P_1$ (mW/μm²) | $\Delta R_1$ (%) | |
| 37 | 63 | 19 | 7 | 11 | 0 | 1.6 | 1.1 | 18 | 6 | 18 | o |
| 38 | 63 | 18 | 7 | 10 | 2 | 1.4 | 1.1 | 18 | 5.5 | 17 | o |

TABLE 3-continued

| Sample No. | Result of AES elementary analysis (at %) | | | | | Au/Se | Darkening property T₁ (μsec) | Darkening property ΔR₀ (%) | Whitening property P₁ (mW/μm²) | Whitening property ΔR₁ (%) | Moisture-proof property 40° C. 90% RH 1 month |
|---|---|---|---|---|---|---|---|---|---|---|---|
| 39 | 60 | 18 | 5 | 12 | 5 | 2.4 | 0.9 | 19 | 6.5 | 18 | o |
| 40 | 58 | 16 | 6 | 11 | 9 | 1.8 | 0.8 | 17 | 6 | 16 | o |
| 41 | 57 | 15 | 5 | 10 | 13 | 2.0 | 0.8 | 16 | 5.5 | 16 | o |
| 42 | 53 | 13 | 5 | 8 | 21 | 1.6 | 0.9 | 18 | 6.5 | 18 | o |
| 43 | 51 | 13 | 5 | 7 | 24 | 1.4 | 1.1 | 16 | 7 | 16 | o |
| 44 | 44 | 13 | 6 | 7 | 30 | 1.2 | 1.7 | 13 | 8 | 12 | o |
| | Te | O | Se | Au | Sb | | | | | | |
| 45 | 61 | 19 | 8 | 10 | 2 | 1.3 | 1.1 | 19 | 6 | 18 | o |
| 46 | 59 | 18 | 6 | 10 | 7 | 1.7 | 0.9 | 17 | 6 | 17 | o |
| 47 | 51 | 14 | 7 | 8 | 20 | 1.1 | 0.9 | 17 | 6.5 | 16 | o |
| 48 | 44 | 14 | 6 | 8 | 28 | 1.3 | 1.3 | 15 | 9 | 14 | o |
| 49 | 63 | 16 | 6 | 12 | 3 | 2.0 | 1.0 | 17 | 6.5 | 17 | o |
| 50 | 61 | 16 | 7 | 10 | 6 | 1.4 | 0.8 | 20 | 6 | 19 | o |
| 51 | 54 | 12 | 6 | 9 | 19 | 1.5 | 0.9 | 18 | 6.5 | 18 | o |
| 52 | 46 | 11 | 6 | 7 | 30 | 1.2 | 1.5 | 17 | 10 | 12 | o |
| | Te | O | Se | Au | In | | | | | | |
| 53 | 60 | 20 | 7 | 11 | 2 | 1.6 | 1.1 | 18 | 6.5 | 18 | o |
| 54 | 59 | 20 | 5 | 10 | 6 | 2.0 | 1.0 | 18 | 5.5 | 18 | o |
| 55 | 55 | 16 | 4 | 8 | 17 | 2.0 | 0.9 | 16 | 6.5 | 16 | o |
| 56 | 49 | 13 | 4 | 7 | 27 | 1.8 | 1.2 | 14 | 10 | 14 | o |

EMBODIMENT 13

Using an electron beam evaporation apparatus which is capable of evaporating from four sources, TeO₂, Te, Au and Se were simultaneously evaporated from respective sources and deposited onto an acrylic resin substrate of 1.1 mm thick and 200 mmφ rotating at 150 rpm, thus forming sample optical disk. The sample optical disk was subjected to an AES elementary analysis and proved that it had a composition expressed by $Te_{60}O_{20}Se_8Au_{12}$. The disk was evaluated by an optical system which is designed to effect recording and erasing by employing two different laser diodes. The evaluation system will be explained hereinunder with specific reference to FIG. 25.

Figure 25:
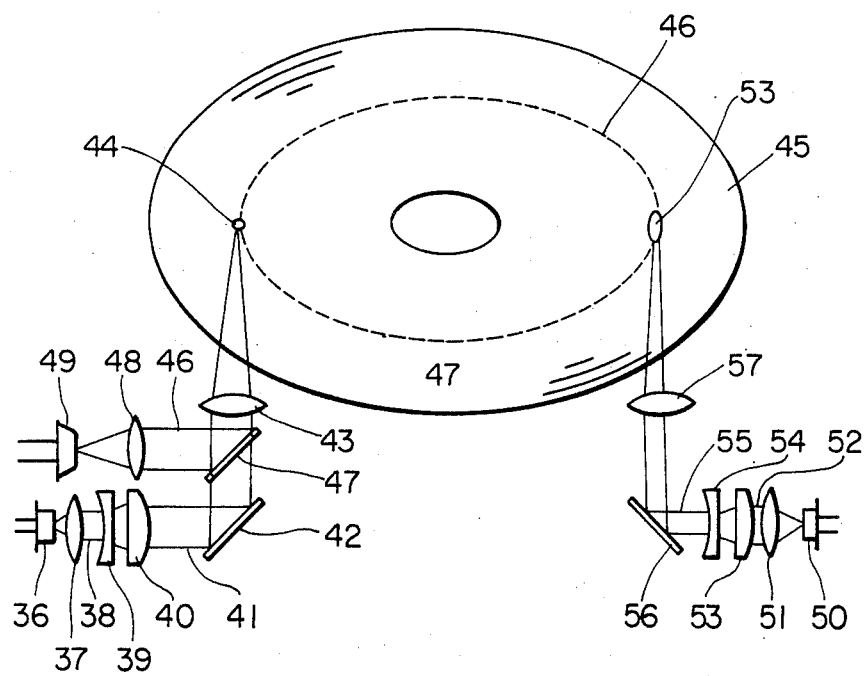
FIG. 25 is an illustration of an optical system for a dynamic recording and erasing of signals in an optical disk to which is applied an optical information recording medium of the invention.

Referring to FIG. 25, an optical system for whitening (recording) and reproducing is shown at the left side part of this Figure. This optical system has a laser diode for recording 36. The beam from this laser diode is changed into a substantially parallel beam 38 by means of a first lens 37, and is shaped by a second lens 39 into a beam having a circular cross-section. The beam is again changed into a parallel beam 41 by a third lens 40 and is transmitted by way of a half mirror 42 to a fourth lens 43 which converges the beam into a tiny circular spot 44 of a size of 0.8μ corresponding to the wavelength limit. This circular spot produces, when applied to the disk surface 45 rotating at 1800 rpm, the same effect as that produced by beam pulses of a comparatively high light power density and a comparatively short irradiation time. Therefore, if the recording film has been darkened beforehand, it is possible to record the whitened signals on the darkened track by a modulation of the irrading laser beam.

The detection of the signals is conducted by a photosensitive diode 49 which receives the light 46 reflected by the disk surface 45 through a half mirror 47 and a lens 48.

An optical system for darkening (erasing) purpose is shown at the right side of FIG. 25. The laser beam emitted from the laser diode for darkening 50 is changed into a parallel beam 52 by means of a first lens 51, and is converged one-dimensionally by a second lens 53. The beam is then changed again into a parallel beam by means of a lens 55 and is applied through a half mirror 56 and a fourth lens 57 onto the disk surface such as to form a spot which is elongated in the direction of rotation of the disk. This elongated beam spot produces the same effect as that produced by a laser beam spot of a comparatively low light power density and a comparatively long irradiation time. It is, therefore, possible to darken the recording film simultaneously with the whitening by the whitening laser spot in real time.

In this embodiment, the darkening laser beam was shaped into 20 μm × 1 μm in terms of the half value width, and was used at a power density of about 1 mW/μm². On the other hand, the whitening laser beam was used at 0.8 μmφ in terms of half value width and a power density of about 7 mW/μm². Recording by whitening and erasing by darkening were conducted by means of these laser beams in the region of 150 mmφ on the disk. As a result, a high C/N ratio exceeding 55 dB was obtained with a single frequency of 5 MHz, and no degradation of C/N ratio was observed even after 100,000 cycles of repetitional recording and erasing.

A similar experiment was conducted by using a darkening laser beam spot of 10 μm × 1 μm at a power density of about 1 mW/μm² and a whitening laser beam spot of 0.8 μmφ at a power density of about 5 mW/μm². A high C/N ratio exceeding 53 dB and safe repetition of recording and erasing over 100,000 cycles of were confirmed.

As has been described, according to the invention, it is possible to obtain a reversible optical information recording medium having the following advantageous effects.

(1) High recording sensitivity (amorphous-forming sensitivity)
(2) High erasing speed (crystallization speed)
(3) High thermal stability of recorded signal (stability of amorphous state)
(4) High mosture-proof property

What is claimed is:

1. A reversible optical information recording medium having a substrate and a thin film formed on said substrate, wherein said thin film is made of a material of a ternary system essentially consisting of Te, O and Au, and further containing one element selected from the group consisting of Ge and Se, wherein when said selected one element is Ge then the composition ratio of Te, Ge and Au in said thin film falls within a region which is defined by points A, B, C and D in FIG. 10, while when said selected one element is Se then the ratios of numbers of atoms of Te, O to the sum of numbers of atoms of Au and Se fall within a region defined by points P, S, T and W in FIG. 24, the ratio of Au to Se($r = Au/Se$) satisfying the condition of $\frac{1}{2} \leq r \leq 5$.

2. A reversible optical information recording medium according to claim 1, wherein the composition ratio of oxygen in said film ranges between 10 and 40 at %.

3. A reversible optical information recording medium according to claim 1, wherein said film is made of a material of a quaternery system consisting essentially of Te, O, Au and Ge and further containing at least one element selected from the group consisting of Sn, In, Bi and Sb.

4. A reversible optical information recording medium according to claim 3, wherein the composition ratio of the sum of the numbers of atoms of Te, Sn, and Ge and the numbers of atoms of Au and O falls within the region surrounded by points $E_1$ to $I_1$ in FIG. 16, and wherein the ratio of numbers of atoms of Te, Sn, and Ge falls within the region defined by points $J_1$ to $O_1$ in FIG. 17.

5. A reversible optical information recording medium according to claim 3, wherein the composition ratio of the sum of the numbers of atoms of Te, In and Ge and the numbers of atoms of Au and O falls within the region surrounded by points $E_2$ to $I_2$ in FIG. 18, and wherein the ratio of numbers of atoms of Te, In and Ge falls within the region defined by points $J_2$ to $O_2$ in FIG. 19.

6. A reversible optical information recording medium according to claim 3, wherein the composition ratio of the sum of the numbers of atoms of Te, Bi and Ge and the numbers of atoms of Au and O falls within the region surrounded by points $E_3$ to $I_3$ in FIG. 21, and wherein the ratio of numbers of atoms of Te, Bi and Ge falls within the region defined by points $J_3$ to $O_3$ in FIG. 21.

7. A reversible optical information recording medium according to claim 3, wherein the composition ratio of the sum of the numbers of atoms of Te, Sb and Ge and the numbers of atoms of Au and O falls within the region surrounded by points $E_4$ to $I_4$ in FIG. 22, and wherein the ratio of numbers of atoms of Te, Sb and Ge falls within the region defined by points $J_4$ to $O_4$ in FIG. 23.

8. A reversible optical information recording medium according to claim 1, wherein the ratios of numbers of atoms of Te to O and the sum of numbers of atoms of Au and Se falls within the region defined by points Q, R, U, V, in FIG. 24, and wherein the ratio of Au to Se ($r = Au/Se$) meets the condition of $1 \leq r \leq 2$.

9. A reversible optical information recording medium according to claim 8, wherein said thin film is made of a material of a ternary system consisting essentially of Te, O and Au, and Se, and further containing at least one element selected from the group consisting of Sn, In, Bi and Sb.

10. A reversible optical information recording medium according to claim 9, wherein the sum of amounts of addition of Sn, In, Bi and Sb is selected to range between 5 and 10 at %.

11. A reversible optical infomation recording medium according to claim 1, wherein said thin film is made of a material of a ternary system consisting essentially of Te, O and Au, and Se, and further containing Ge.

12. A reversible optical information recording medium according to claim 11, wherein the concentration of Ge in said film ranges between 1 and 10 at %.

13. A reversible optical information recording medium according to claim 1, wherein said thin film is made of a material of a ternary system consisting essentially of Te, O and Au, and Se, and further containing at least one element selected from the group consisting of Sn, In, Bi and Sb.

14. A reversible optical information recording medium according to claim 13, wherein the sum of amounts of addition of Sn, In, Bi and Sb is selected to range between 5 and 20 at %.

* * * * *